United States Patent [19]

Ito et al.

[11] Patent Number: 5,228,757
[45] Date of Patent: Jul. 20, 1993

[54] SYSTEM FOR CONTROLLING BEHAVIOR OF VEHICLE DURING BRAKING AND DURING A STEERING MANEUVER

[75] Inventors: Ken Ito; Yoshiki Yasuno, both of Yokohama, Japan

[73] Assignee: Nissan Motor Co., Ltd., Yokohama, Japan

[21] Appl. No.: 721,769

[22] Filed: Jun. 28, 1991

[30] Foreign Application Priority Data

Jul. 2, 1990 [JP] Japan ................ 2-172584

[51] Int. Cl.$^5$ ............................................ B60T 8/64
[52] U.S. Cl. .................................... 303/100; 303/92; 303/9.62; 364/426.01
[58] Field of Search ............... 303/100, 109, 106, 103, 303/9.62; 280/142; 364/426.1

[56] References Cited

U.S. PATENT DOCUMENTS

| | | | |
|---|---|---|---|
| 3,904,251 | 9/1975 | Hikida et al. | 303/109 |
| 3,966,264 | 6/1976 | Mattori et al. | 303/100 |
| 4,042,059 | 8/1977 | Bertolasi | 303/100 X |
| 4,758,053 | 7/1988 | Yasuno | 303/100 |
| 4,759,590 | 7/1988 | Uchida et al. | 303/100 X |
| 4,848,851 | 7/1989 | Kuraoka et al. | 303/109 |
| 4,862,368 | 8/1989 | Kost et al. | 303/109 X |
| 4,979,114 | 12/1990 | Oshita et al. | 180/142 |
| 5,134,352 | 7/1992 | Matsumoto et al. | 303/92 |

FOREIGN PATENT DOCUMENTS

| | | |
|---|---|---|
| 392165 | 10/1990 | European Pat. Off. |
| 3518221 | 11/1985 | Fed. Rep. of Germany |
| 59-155264 | 10/1984 | Japan |

OTHER PUBLICATIONS

K. Ito, et al., "A New Way of Controlling a Four Wheel Steering Vehicle", Keisokujidoseigyogakkai Ronbunshu, vol. 23, No. 8, pp. 48-54.

*Primary Examiner*—Matthew C. Graham
*Attorney, Agent, or Firm*—Foley & Lardner

[57] ABSTRACT

A control system for a wheeled vehicle, comprises a brake actuator for controlling a behavior of the vehicle during braking by producing a braking force difference between a left wheel braking force and a right wheel braking force in response to a control signal, a sensor for sensing an actual vehicle motion variable such as a yaw rate, and a controller for controlling the vehicle motion by producing the control signal. The controller determines an estimated vehicle motion variable from a driver's steering command by using one or more predetermined estimator transfer characteristics, compares the sensed and estimated vehicle motion variables to determine a deviation therebetween, and determines the magnitude of the control signal so as to reduce the deviation by using a predetermined compensator transfer characteristic and a predetermined filter transfer characteristic for filtering the deviation.

21 Claims, 13 Drawing Sheets

SYSTEM FOR CONTROLLING BEHAVIOR OF VEHICLE DURING BRAKING AND DURING A STEERING MANEUVER

BACKGROUND OF THE INVENTION

The present invention relates to a vehicle control system for ensuring a desired vehicle behavior during braking.

During braking, a vehicle planar motion represented by a vehicle yaw rate and a side slipping motion is affected by characteristic changes such as a change in a tire cornering power due to weight transfer during braking and a decrease in a cornering force due to a braking force produced at a tire contact portion. Therefore, the steering response characteristic during braking is considerably different from the characteristic during constant speed conering operations. Drivers are often bewildered by unexpected vehicle behavior during braking.

Furthermore, an unexpected yawing motion is produced by brake application during a straight ahead operation if the balance in the friciton coefficient of a brake pad between left and right wheels is lost.

Japanese Utility Model Provisional Publication No. 59-155164 discloses a brake control system. This brake control system is designed to increase a vehicle yawing response during braking by retarding an increase of the brake fluid pressure for the outside wheel of a turn with respect to an increase of the brake fluid pressure for the inside wheel if the steering angle becomes equal to or greater than a predetermined value during braking. However, this brake control system is not designed to compensate for changes in the vehicle characteristics.

SUMMARY OF THE INVENTION

It is an object of the present invention to provide a vehicle control system which can ensure a desired vehicle behavior during braking by acting to compensate for the effects of disturbances and changes in the characteristics of a controlled vehicle.

According to the present invention, a control system for a controlled vehicle such as a motor vehicle, comprises a brake system for braking the controlled vehicle, a steering system for steering the controlled vehicle, a brake actuating means, a sensing means, and a controlling means. The brake actuating means is a means for controlling a behavior of the controlled vehicle during braking by developing a left and right braking force difference between left and right wheels of the controlled vehicle in accordance with a braking force difference control signal representing a brake control input such as a vehicle yawing moment due to a left and right braking force difference. The sensing means is a means for sensing a steering input applied to the steering system by a driver of the vehicle, and an actual vehicle motion variable of the wheeled vehicle. The vehicle motion variable is a physical quantity representing a steering response of the vehicle. The vehicle motion variable may be a vehicle yaw rate, or a motion variable representing a vehicle side (or lateral) translational motion. The controlling means is a means for determining an estimated vehicle motion variable, such as an estimated yaw rate, from the steering input and the brake control input by using a predetermined first estimator transfer characteristic which is a transfer characteristic designed to determine a vehicle response from an input to the steering system and a predetermined second estimator transfer characteristic which is a transfer characteristic for determining a vehicle response to an input to the brake system, producing a deviation signal representing a vehicle motion deviation between the sensed actual vehicle motion variable and the estimated vehicle motion variable, and further producing the control signal in accordance with the deviation by using a predetermined feedback compensator transfer characteristic and a predetermined filter transfer characteristic. The compensator transfer characteristic is in the form of a function of the second estimator transfer characteristic, and designed to determine an input to the brake system from a vehicle response. The filter transfer characteristic is a transfer function which can be arbitrarily determined by a designer of the control system.

DETAILED DESCRIPTION OF THE INVENTION

Figure 1:
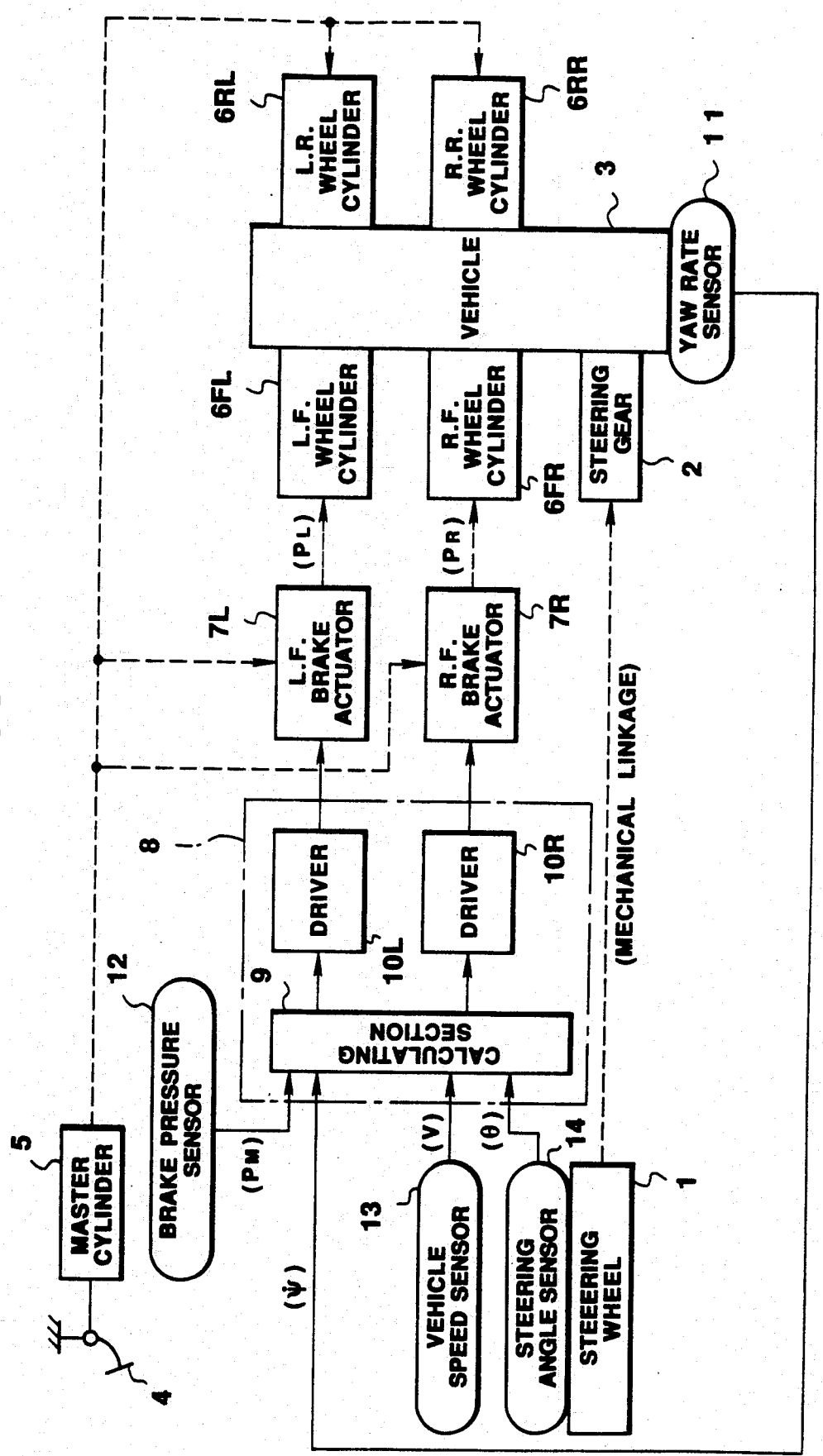
FIG. 1 is a block diagram showing a control system according to a first embodiment of the present invention.
Figure 2:
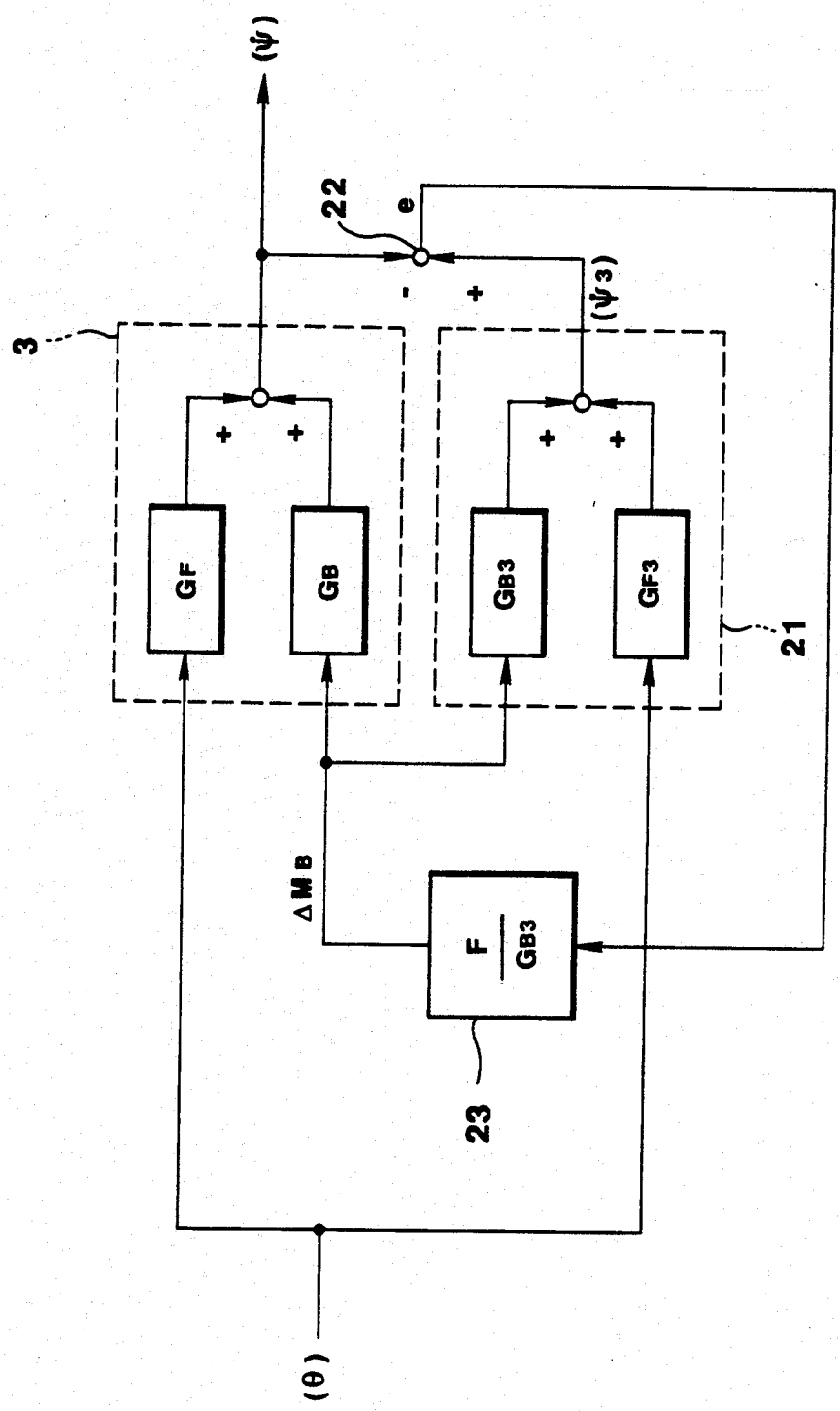
FIG. 2 is a block diagram showing the control system of the first embodiment in terms of transfer characteristics.
Figure 3:
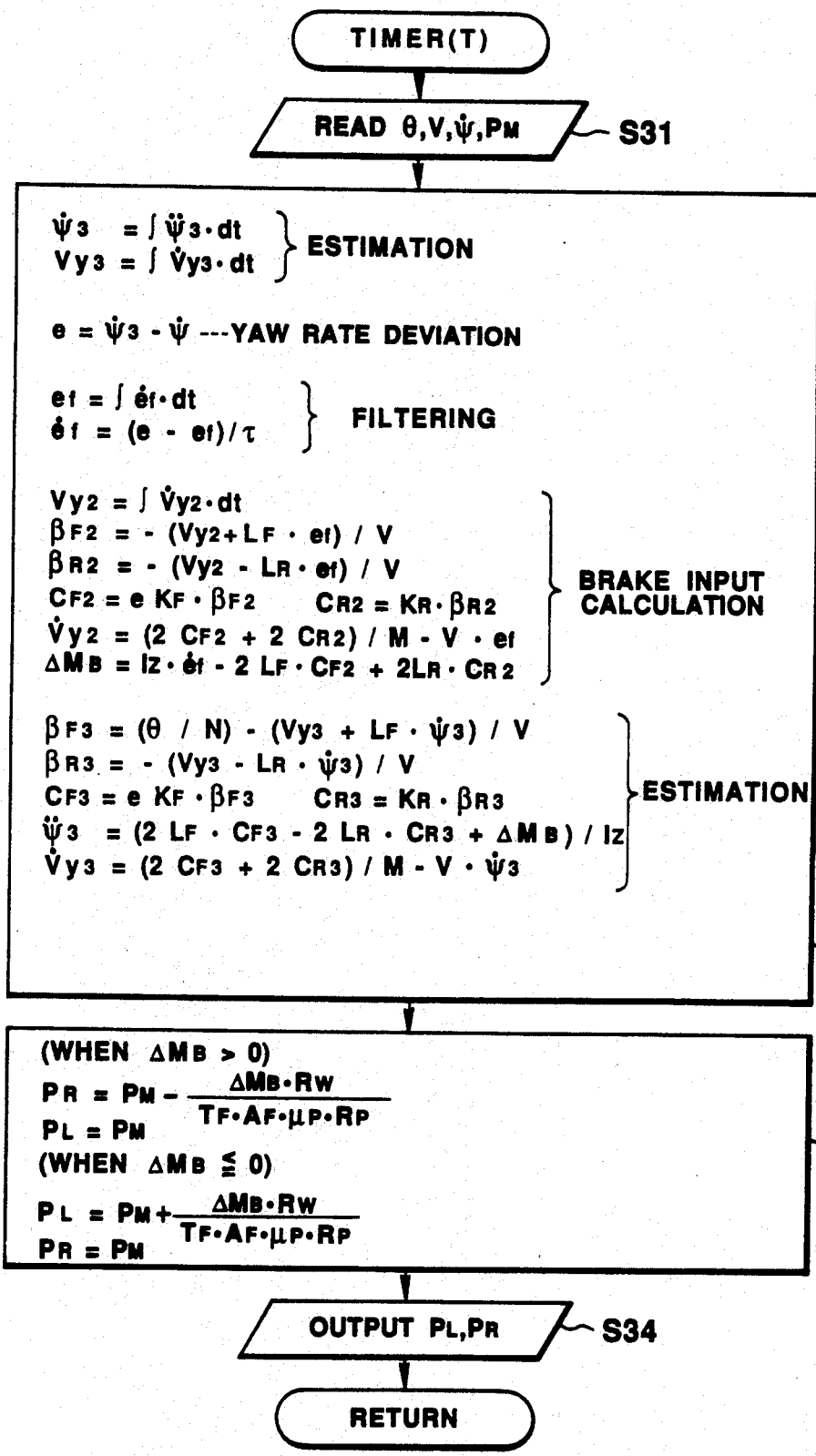
FIG. 3 is a flowchart showing a control program employed in the first embodiment.

A first embodiment of the present invention is shown in FIGS. 1-3. FIG. 1 shows the hardware of a vehicle motion control system according to the first embodiment of the invention. FIG. 2 shows transfer characteristics used in the control system according to the first embodiment. FIG. 3 shows a control program according to the first embodiment.

As shown in FIG. 1, a wheeled vehicle 3, such as an automobile, comprises a steering system which comprises a steering wheel 1 and a steering gear 2, and a brake system which comprises a brake pedal 4, a master cylinder 5, a left front wheel cylinder 6FL, a right front wheel cylinder 6FR, a left rear wheel cylinder 6RL and a right rear wheel cylinder 6RR.

In the steering system of this example, the steering wheel 1 is connected with front wheels of the vehicle 3 by a mechanical front steering linkage for transmitting mechanical motion (or a mechanical steering signal) from the steering wheel 1 to the front wheels. The steering gear 2 is provided in the steering linkage, and arranged to steer the front wheels in accordance with the steering angle of the steering wheel 1. A driver of the vehicle can control the direction of movement of the vehicle by applying a steering input to the steering system. The vehicle motion resulting from the steering input is known as a steering response. The steering input may be in the form of a steering wheel angle, a front wheel steer angle or an angular or translational displacement of some other movable element of the steering system.

The vehicle control system according to the first embodiment comprises a brake actuating (or brake modulating) means which comprises a left front brake actuator (or brake modulator) 7L and a right front brake actuator (or brake modulator) 7R. The master cylinder 5 is a primary unit for producing a master cylinder fluid pressure PM in accordance with a force applied to the brake pedal 4. The master cylinder 5 is connected with the wheel cylinders 6FL, 6FR, 6RL and 6RR by a hydraulic circuit for delivering the master cylinder fluid pressure to each wheel cylinder. In this embodiment, the left front brake actuator 7L receives the master cylinder fluid pressure PM from the master cylinder 5, and produces a left front brake fluid pressure PL which is supplied to the left front wheel cylinder 6FL. The right front brake actuator 7R receives the master cylinder fluid pressure PM, and produces a right front brake fluid pressure PR which is supplied to the right front wheel cylinder 6FR. Therefore, the left and right brake actuators 7L and 7R can make a left front brake actuation force produced by the left front wheel cylinder 6FL and a right front brake actuation force produced by the right front wheel cylinder 6FR different from each other. The control system of this embodiment can control a vehicle behavior during braking by developing a difference between a left braking force produced at the left front wheel of the vehicle and a right braking force produced at the right front wheel of the vehicle. The longitudinal forces at the left and right wheels resulting from a driver's input to the brake system (or a driver's input to an accelerator pedal) of the vehicle can modify the directional response of the vehicle.

The control system of this embodiment further comprises a controller 8 for electronically controlling the vehicle motion by controlling the left and right brake actuators 7L and 7R. The controller 8 of this embodiment is a computer system having, as a main component, a microcomputer mounted on the vehicle. The controller 8 of the first embodiment comprises a circuit (or section) 9 for calculating a brake control input representing a left and right braking force difference, and driver circuits (or sections) 10L and 10R for supplying left and right brake force control signals, respectively, to the left and right brake actuators 7L and 7R.

The control system of this embodiment further comprises a sensor group which comprises a vehicle motion variable sensor 11 (such as a yaw rate sensor), a brake sensor 12, a vehicle speed sensor 13 and a steering input sensor 14. The vehicle motion variable sensor 11 is a sensor for determining an actual vehicle motion variable, such as a yaw rate or a lateral acceleration, representing a vehicle cornering behavior of the vehicle. The vehicle motion variable sensor 11 may be arranged to directly sense a vehicle operating condition indicative of a vehicle yawing motion or a vehicle side (or lateral) translational motion. The vehicle motion variable sensor of the first embodiment is a yaw rate sensor 11 for sensing the actual yaw rate $\dot{\psi}$ of the vehicle 3 and producing a yaw rate signal representing the sensed actual yaw rate $\dot{\psi}$. The brake sensor 12 of this embodiment is a brake pressure sensor for sensing the master cylinder fluid pressure PM produced by the master cylinder 5. The vehicle speed sensor 13 senses a vehicle speed V of the vehicle. The steering input sensor 14 is a sensor for sensing an angular or linear displacement of a movable element of the steering system to determine a primary steering input produced by the driver of the vehicle. In this embodiment, the steering input sensor is a steering angle sensor 14 for sensing an angular displacement (steering wheel angle) $\theta$ of the steering wheel 1. The calculating circuit 9 of the controller 8 is connected with these sensors 11, 12, 13 and 14, and designed to calculate a left front brake fluid pressure PL (corresponding to a left brake actuation force) and a right front brake fluid pressure PR (corresponding to a right brake actuation force) according to the control procedure shown in FIG. 3. The driver circuits 10L and 10R deliver the left brake force signal and the right brake force signal, respectively, to the left and right brake actuators 7L and 7R, and, by so doing, causes the left and right brake actuators 7L and 7R to make the actual left brake fluid pressure equal to the calculated left brake fluid pressure and the actual right brake fluid pressure equal to the calculated right brake fluid pressure. In this embodiment, the yaw rate $\dot{\psi}$ is employed as a vehicle planar motion variable representing a vehicle planar motion including at least one of a vehicle yawing motion and a vehicle side translational motion. The yaw rate is a controlled variable of the control system of this embodiment.

As shown in FIG. 2, a primary steering input in the form of the steering wheel angle $\theta$, and a brake input in the form of a vehicle yawing moment $\Delta M_B$ due to a left and right braking force difference can be both regarded as inputs to the vehicle, and the yaw rate $\dot{\psi}$ can be regarded as a control output (a vehicle planar motion). The vehicle 3 is a controlled system (or plant). A transfer characteristic of the vehicle relating to this planar vehicle motion can be approximately expressed by the following equations of vehicle motion.

$$I_Z \cdot \ddot{\psi} = 2L_F \cdot C_F - 2L_R \cdot C_R + \Delta M_B$$

$$M \cdot a = M(\dot{V}_y + V \cdot \dot{\psi}) = 2C_F + 2C_R$$

$$C_F = eK_F \cdot \beta_F$$

$$C_R = K_R \cdot \beta_R$$

$$\beta_F = (\theta/N) - (V_y + L_F \dot{\psi})/V$$

$$\beta_R = (V_y - L_R \dot{\psi})/V \quad (1)$$

where $I_Z$ = a vehicle yawing moment of inertia, $L_F$ = a vehicle's distance between a front wheel position and a vehicle's center of gravity, $L_R$ = a distance between a rear wheel position and the center of gravity, $C_F$ = a front wheel cornering force, $C_R$ = a rear wheel cornering force, M=a vehicle mass, α=a vehicle lateral acceleration, eKF=a front wheel equivalent cornering power, KR=a rear wheel tire cornering power, βF=a front wheel side slip angle, βR=a rear wheel side slip angle, N=a gear ratio of the steering gear 2, and Vy=a side speed.

From these equations (1), we can obtain the following relationship (2) between the theoretical control output $\dot{\psi}(t)$ and the control inputs $\theta(t)$, $\Delta M_B(t)$, by using a theoretical (estimator) transfer function $G_{F3}(s,V)$ of the control output to the steering input $\theta(t)$ and a theoretical (estimator) transfer function $G_{B3}(s,V)$ of the control output to the brake input $\Delta M_B$. Each of the output and inputs is a quantity which varies as a function of time t. The instantaneous magnitude of each quantity at a given instant (t=a given value) is denoted by (t).

$$\dot{\psi}_3(t) = G_{F3}(s,V)\theta(t) + G_{B3}(s,V)\Delta M_B(t) \quad (2)$$

In this equation, s is a differential operator corresponding to d/dt, and V is the vehicle speed. Each of the transfer functions $G_{F3}(s, V)$ and $G_{B3}(s,V)$ is a function of s and V. Hereinafter, (t) and (s, V) are omitted to simplify mathematical expressions.

As shown in FIG. 2, the controller 8 of the first embodiment comprises a vehicle motion estimating section 21 which is a model system simulating a vehicle behavior according to the equation (2). The estimating section 21 is designed to estimate a yaw rate of the controlled vehicle 3 resulting from the steering angle $\theta$ and the yawing moment $\Delta M_B$, and to determine an estimated yaw rate $\dot{\psi}_3$ of the controlled vehicle 3 by solving the mathematical vehicle model (2). On the other hand, the actual vehicle 3 responds to the steering angle $\theta$ and the yawing moment $\Delta M_B$, and yields the actual yaw rate $\dot{\psi}$ according to actual (vehicle) transfer functions $G_F$ and $G_B$. The actual yaw rate $\dot{\psi}$ is given by:

$$\dot{\psi} = G_F \cdot \theta + G_B \cdot \Delta M_B$$

The controller 8 of this embodiment further comprises a subtracting element (or means) 22 for comparing the actual yaw rate $\dot{\psi}$ sensed by the yaw rate sensor 11 with the estimated yaw rate $\dot{\psi}_3$ determined by the estimating section 21, and produces a yaw rate deviation signal representing a yaw rate deviation (or error) e between the estimate yaw rate $\dot{\psi}_3$ and the sensed actual yaw rate $\dot{\psi}$. The yaw rate deviation e is expressed as; $e = \dot{\psi}_3 - \dot{\psi}$.

The controller 8 of this embodiment further comprises a feedback compensating section 23 for receiving the deviation signal from the subtracting element 22 and determining a desired vehicle yawing moment $\Delta M_B$ by using a predetermined compensator transfer function $1/G_{B3}$ and a filter transfer function F. The desired yawing moment $\Delta M_B$ is a yawing moment required to reduce the yaw rate deviation e to zero. The compensator transfer function is a function of the estimator transfer function $G_{B3}$ and in the form of the reciprocal (inverse transfer function) $1/G_{B3}$ of the estimator transfer function $G_{B3}$ between the yaw rate and the brake input. The filter transfer function F is a transfer function which can arbitrarily determined for the yaw rate by a designer of the control system. The filter transfer function F is chosen so that a steady state (response) gain of the filter transfer function F is equal to one. The feedback compensating section 23 determines the yawing moment $\Delta M_B$ according to the following equation (3).

$$\Delta M_B = \frac{F}{G_{B3}} e \quad (3)$$

The thus-determined yawing moment $\Delta M_B$ is inputted to the brake system of the vehicle. The controller 8 of this embodiment further comprises a brake force determining section for receiving the yawing moment $\Delta M_B$ and determining a left brake actuation force and a right brake actuation force which are required to cause the brake system to produce the calculated yawing moment $\Delta M_B$. In this example, the brake force determining section determines the left front brake fluid pressure $P_L$ and the right front brake fluid pressure $P_R$.

When the approximate simulation model such as the equations (1) is employed, the estimator transfer function $G_{B3}$ takes the form of [first order]/[second order]. Therefore, in order to design the controlling system which requires no genuine differentation, the filter transfer characteristic F is set as;

$$F(s) = \frac{1}{1 + \tau s} = \frac{[\text{zero order}]}{[\text{first order}]}$$

In this equation, $\tau$ is a time constant. It is preferable to set the filter transfer function F so that a difference resulting from subtraction of the order of a numerator of the filter transfer function F from the order of a denominator of the filter transfer function F is equal to or greater than a difference resulting from subtraction of the order of a numerator of the estimator transfer function $G_{B3}$ from the order of a denominator of the estimator transfer function $G_{B3}$. In this case, the control system can provide a stable vehicle behavior during braking by minimizing undesired influence of parameter changes.

The controller 8 of the first embodiment controls a difference between left and right braking forces by performing the control program shown in FIG. 3 in a timer interrupt handling mode each time a predetermined time interval T msec (control cycle time) elapses.

At a step S31, the controller 8 (or the CPU of the onboard microcomputer) first reads current values of the steering angle $\theta$, the vehicle speed V, the yaw rate $\dot{\psi}$ and the master cylinder fluid pressure $P_M$ which are, respectively, sensed by the sensors 14, 13, 11 and 12. At a next step S32, from these input data items, the controller 8 determines a current value of the brake control input in the form of the yawing moment $\Delta M_B$ in accordance with the following mathematical relationships.

The controller 8 determines an estimated (desired) yaw rate $\dot{\psi}_3$, and an estimated (desired) side speed $V_{y3}$ by integration of an estimated (desired) yaw acceleration $\ddot{\psi}_3$ and an estimated (desired) side acceleration $\dot{V}_{y3}$. In general, it is difficult to perform integration by digital computation. Therefore, the controller 8 of this embodiment uses the following approximation method.

$$\dot{\psi}_3 = \dot{\psi}_3 + T \cdot \ddot{\psi}_3$$

$$V_{y3} = V_{y3} + T \cdot \dot{V}_{y3}$$

In these equations, $\ddot{\psi}_3$ is a previous (old) value of the estimated yaw acceleration which was determined in the last execution of the control program as explained below, and $\dot{V}_{y3}$ is a previous (old) value of the estimated side acceleration which was determined in the last execution of the control program. These mathematical operations correspond to a part of the vehicle motion estimating section 21. In this embodiment, this approximate integration process is used whenever integration is required.

Then, the controller 8 determines the yaw rate deviation (or error) $e = \dot{\psi}_3 - \dot{\psi}$. This operation corresponds to the subtracting element (or means) 22. Then, the controller 8 performs a filtering process to the yaw rate deviation, in the following manner.

$$ef = \int \dot{e}f \cdot dt$$

$$\dot{e}f = (e - ef)/\tau$$

This filtering process corresponds to the following mathematical operation.

$$ef = \frac{1}{1 + \tau s} e$$

Then, the controller 8 determines the yawing moment $\Delta M_B$ to reduce the yaw rate deviation e, according to known equations of vehicle motion. In this embodiment, the controller 8 first determines a front wheel side slip angle $\beta_{F2}$ and a rear wheel side slip angle $\beta_{R2}$ to reduce the yaw rate deviation e, from a vehicle side speed $V_{y2}$, a distance $L_F$ between the front wheel position and the center of gravity, a distance $L_R$ between the rear wheel position and the center of gravity, the vehicle speed V and the filtered deviation ef, according to the following equation.

$$\beta_{F2} = -(V_{y2} + L_F \cdot ef)/V$$

$$\beta_{R2} = -(V_{y2} + L_R \cdot ef)/V$$

The side speed $V_{y2}$ is obtained by the approximate integration of a side acceleration $\dot{V}_{y2}$, using a previous value of the side acceleration determined in the last execution. From the thus-obtained front and rear wheel slip angles $\beta_{F2}$ and $\beta_{R2}$, a front wheel equivalent cornering power $eK_F$ and a rear wheel tire cornering power $K_R$, the controller 8 further determines front and rear wheel cornering forces $C_{F2}$ and $C_{R2}$ to reduce the yawing rate deviation e, according to the following equations.

$$C_{F2} = eK_F \cdot \beta_{F2}$$

$$C_{R2} = K_R \cdot \beta_{R2}$$

Then, the controller 8 determines the side acceleration $\dot{V}_{y2}$ for use in the next control cycle, by using the following equation.

$$\dot{V}_{y2} = (2C_{F2} + 2C_{R2})/M - V \cdot ef$$

In this equation, M is a vehicle mass. Finally, the controller 8 determines the yawing moment $\Delta M_B$ to reduce the yaw rate deviation e to zero, by using the following equation.

$$\Delta M_B = I_z \cdot \dot{e} - 2L_F \cdot C_{F2} + 2L_R \cdot C_{R2}$$

The thus-determined yawing moment can be regarded as a brake control input. A signal representing $\Delta M_B$ can be regarded as a braking force difference control signal.

The controller 8 further determines the estimated (desired) yaw acceleration $\ddot{\psi}_3$ and the estimated (desired) side acceleration $\dot{V}_{y3}$ for use in the next control cycle. These operations correspond to the remaining part of the vehicle motion estimating section 21. First, the controller 8 determines estimated (desired) front and rear wheel side slip angles $\beta_{F3}$ and $\beta_{R3}$, as follows.

$$\beta_{F3} = (\theta/N) - (V_{y3} + L_F \dot{\psi}_3)/V$$

$$\beta_{R3} = -(V_{y3} - L_R \dot{\psi}_3)/V$$

In these equations, $\theta$ is the steering wheel angle, and N is a steering gear ratio. From these front and rear side slip angles, the controller 8 determines estimated (desired) front and rear wheel cornering forces $C_{F3}$ and $C_{R3}$ as follows.

$$C_{F3} = eK_F \cdot \beta_{F3}$$

$$C_{R3} = K_R \cdot \beta_{R3}$$

Finally, the controller 8 determines the estimated yaw acceleration $\ddot{\psi}_3$ and the estimated side acceleration $\dot{V}_{y3}$ by using the following equations.

$$\ddot{\psi}_3 = (2L_F \cdot C_{F3} - 2L_R \cdot C_{R3} + \Delta M_B)/I_z$$

$$\dot{V}_{y3} = (2C_{F3} + 2C_{R3})/M - V \cdot \dot{\psi}_3$$

At a next step S33, the controller 8 calculates the left brake fluid pressure $P_L$ corresponding to the left brake actuation force and the right brake fluid pressure $P_R$ corresponding to the right brake actuation force, which are required to produce the calculated yawing moment $\Delta M_B$. When the yawing moment $\Delta M_B$ is positive, that is, the yaw rate deviation is produced in the right vehicle turning direction, then the controller 8 sets the left front brake fluid pressure $P_L$ equal to the master cylinder pressure $P_M$, and sets the right front brake fluid pressure $P_R$ according to the following equation.

$$P_R = P_M - \frac{\Delta M_B \cdot R_w}{T_F \cdot A_F \cdot \mu_P \cdot R_p}$$

In this equation, $T_F$ is a front wheel tread width (that is the distance between the center points of the left and right tire treads), $A_F$ is a pressure receiving area of the front wheel cylinders, $\mu_p$ is a brake pad friction coefficient (a nominal value is used), $R_p$ is an effective radius of the front wheel cylinders, and $R_w$ is a front wheel loaded tire radius. In this way, the control system makes the right front brake fluid pressure $P_R$ lower than the left front brake fluid pressure $P_L$ when $\Delta M_B$ is greater than zero. When the yaw rate deviation e takes place in the left turning direction and accordingly the yawing moment $\Delta M_B$ is equal to or smaller than zero, then the controller 8 sets the right front brake fluid pressure $P_R$ equal to the master cylinder fluid pressure $P_M$, and sets the left front brake fluid pressure $P_L$ as;

$$P_L = P_M + \frac{\Delta M_B \cdot R_w}{T_F \cdot A_F \cdot \mu_P \cdot R_p}$$

Therefore, the left front brake fluid pressure $P_L$ is made lower than the right font brake fluid pressure $P_R$ by an amount proportional to $\Delta M_B$. The step S33 to determine $P_L$ and $P_R$ from $\Delta M_B$ corresponds to the brake force determining section of the controller 8.

At a step S34, the controller 8 produces the left brake force control signal representing $P_L$ and the right brake force control signal representing PR, and sends these signals, respectively, to the left and right brake actuators 7L and 7R through the driver circuits 10L and 10R. Therefore, the left and right brake actators 7L and 7R causes the left and right front wheel cylinders 6FL and 6FR to develop such a difference between the braking force of the left front wheel and the braking force of the right front wheel as to reduce the yaw rate deviation e to zero. In this way, the control system of this embodiment can always provide an adequate braking behavior notwithstanding changes in the actual characteristics of the controlled vehicle 3.

Figure 4A:
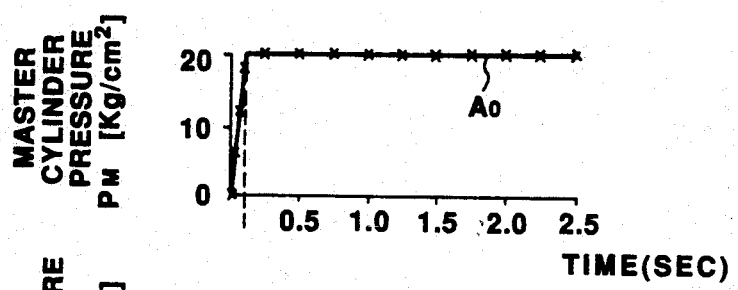
FIGS. 4A-D are graphical representations illustrating effects of the control system of the first embodiment.
Figure 4B:
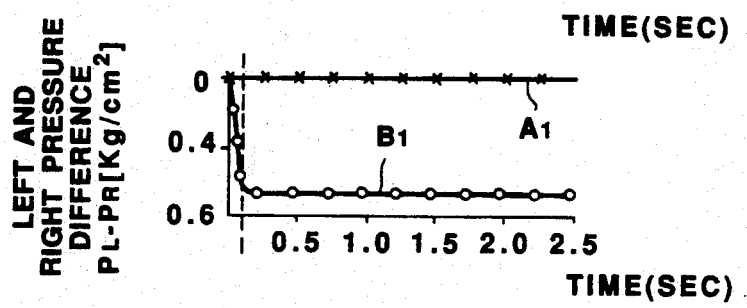
Figure 4C:
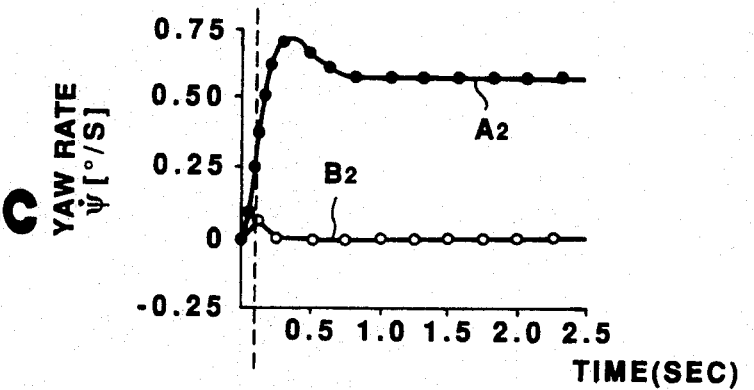
Figure 4D:
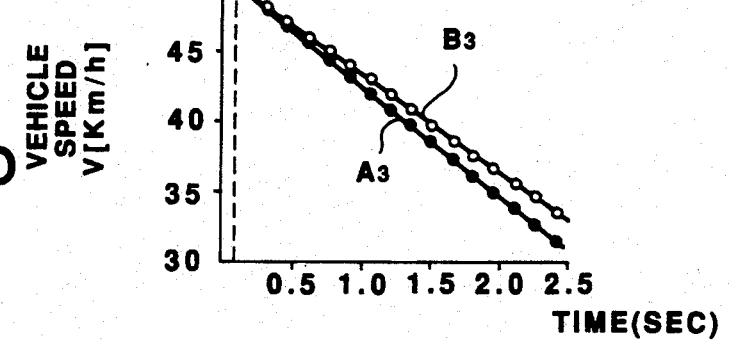

FIGS. 4A-D show effects of the control system of the first embodiment by the results of a simulation. Graphs of FIGS. 4A-D show vehicle behaviors resulting from a brake application during a straight ahead operation when the friction coefficient of the brake pad for the right rear wheel is reduced by half by water or some other factor. A line $A_0$ of FIG. 4A shows a step change of the master cylinder pressure $P_M$. The yaw rate of a conventional vehicle largely changes as shown by a line $A_2$ (FIG. 4C) in response to the step change of $P_M$. In the conventional vehicle, the left and right brake pressures $P_L$ and $P_R$ are held equal to each other, and the left and right brake fluid pressure difference $P_L - P_R$ is fixed at zero as shown by a line $A_1$ in FIG. 4B. The vehicle speed V is decreased as shown by a line $A_3$ in FIG. 4D. In this way, the yaw rate is produced by a brake application while the driver holds the steering wheel at the straight ahead position. On the other hand, the control system of the first embodiment decreases the left front brake pressure $P_L$ as shown by a line $B_1$ in FIG. 4, and, by so doing, prevents a rise of the yaw rate as shown by a line $B_2$ in FIG. 4. The vehicle speed V is decreased as shown by a line $B_3$. The decrease of the vehicle speed is slightly slower than that of the conventional vehicle. However, this deterioration in the brake effectiveness is very small. The control system of this embodiment can prevent a loss of the directional control of the vehicle during braking, and improve the safety of the vehicle.

The yawing moment $\Delta M_B$ required to eliminate the yaw rate deviation e is expressed as;

$$\Delta MB = e \cdot \frac{F}{GB_3}$$

$$= (\dot{\psi}_3 - \dot{\psi}) \frac{F}{GB_3}$$

$$= \{\Delta MB \cdot GB_3 + \theta GF_3 - \dot{\psi}\} \frac{F}{GB_3}$$

$$= \Delta MB \cdot F + \theta \frac{GF_3 F}{GB_3} - \dot{\psi} \frac{F}{GB_3}$$

$$\therefore \Delta MB(1 - F) = \theta F \frac{GF_3}{GB_3} - \dot{\psi} \frac{F}{GB_3}$$

$$\therefore \Delta MB = \left( \theta \cdot F \frac{GF_3}{GB_3} - \dot{\psi} \frac{F}{GB_3} \right) \frac{1}{1 - F}$$

Figure 5:
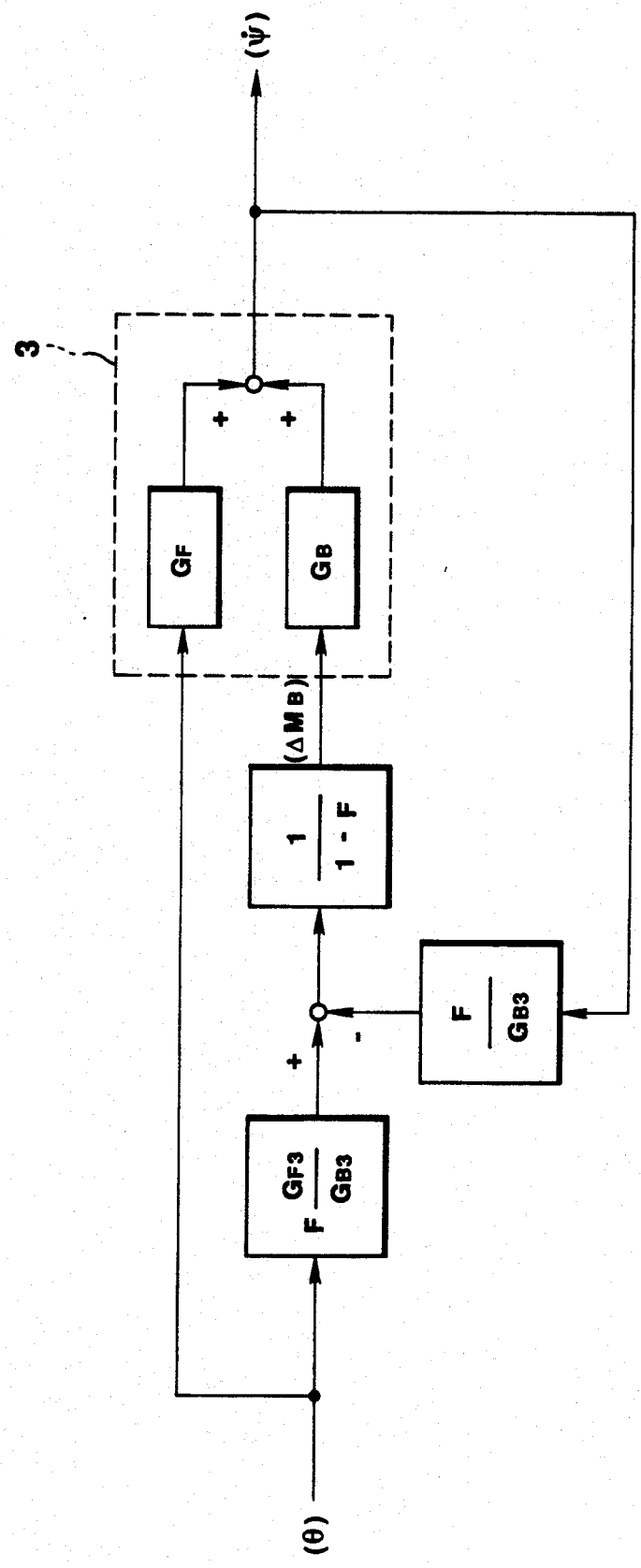
FIG. 5 is a block diagram showing an arrangement of transfer characteristics which is equivalent to the arrangement shown in FIG. 2.

Therefore, the arrangement of the transfer functions shown in FIG. 2 is equivalent to an arrangement shown in FIG. 5. The controller 8, when constructed as shown in FIG. 5, comprises a first operational section (or means) which receives the actual yaw rate as an input signal, and which produces a first intermediate signal according to a first transfer function expressed as $F/GB_3$, a second operational section (or means) which receives the steering angle $\theta$ as an input signal, and which produces a second intermediate signal according to a second transfer function expressed as $F(GF_3/GB_3)$, a subtracting section (means) for producing a third intermediate signal representing a difference between the first and second intermediate signals, and a third operational section (or means) which receives the third intermediate signal from the subtracting section, and which determines $\Delta M_B$ according to a third transfer function expressed as $1/(1-F)$ and produces the braking force difference control signal representing $\Delta M_B$.

Figure 6:
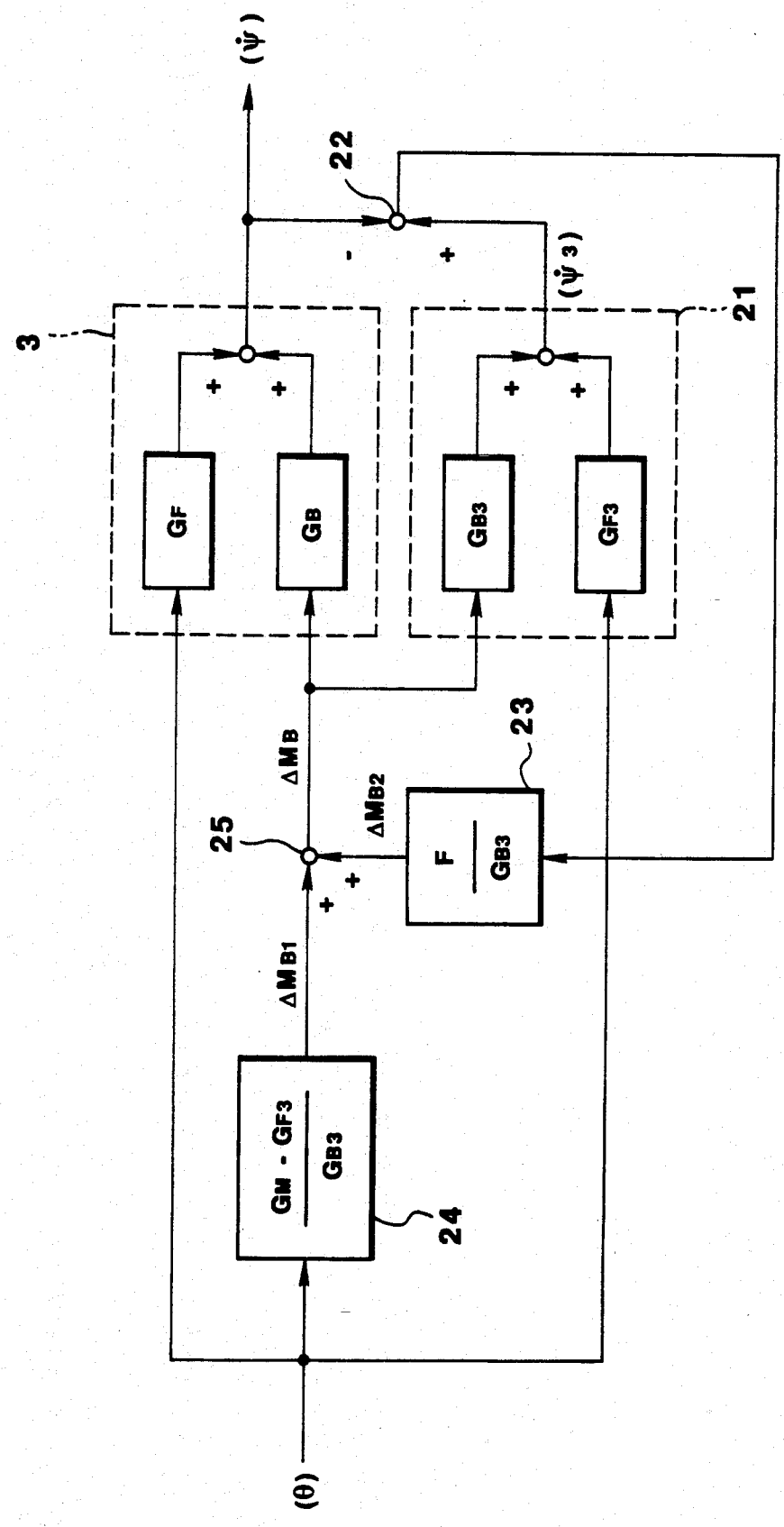
FIG. 6 is a block diagram showing a control system according to a second embodiment of the present invention in terms of transfer characteristics.
Figure 7:
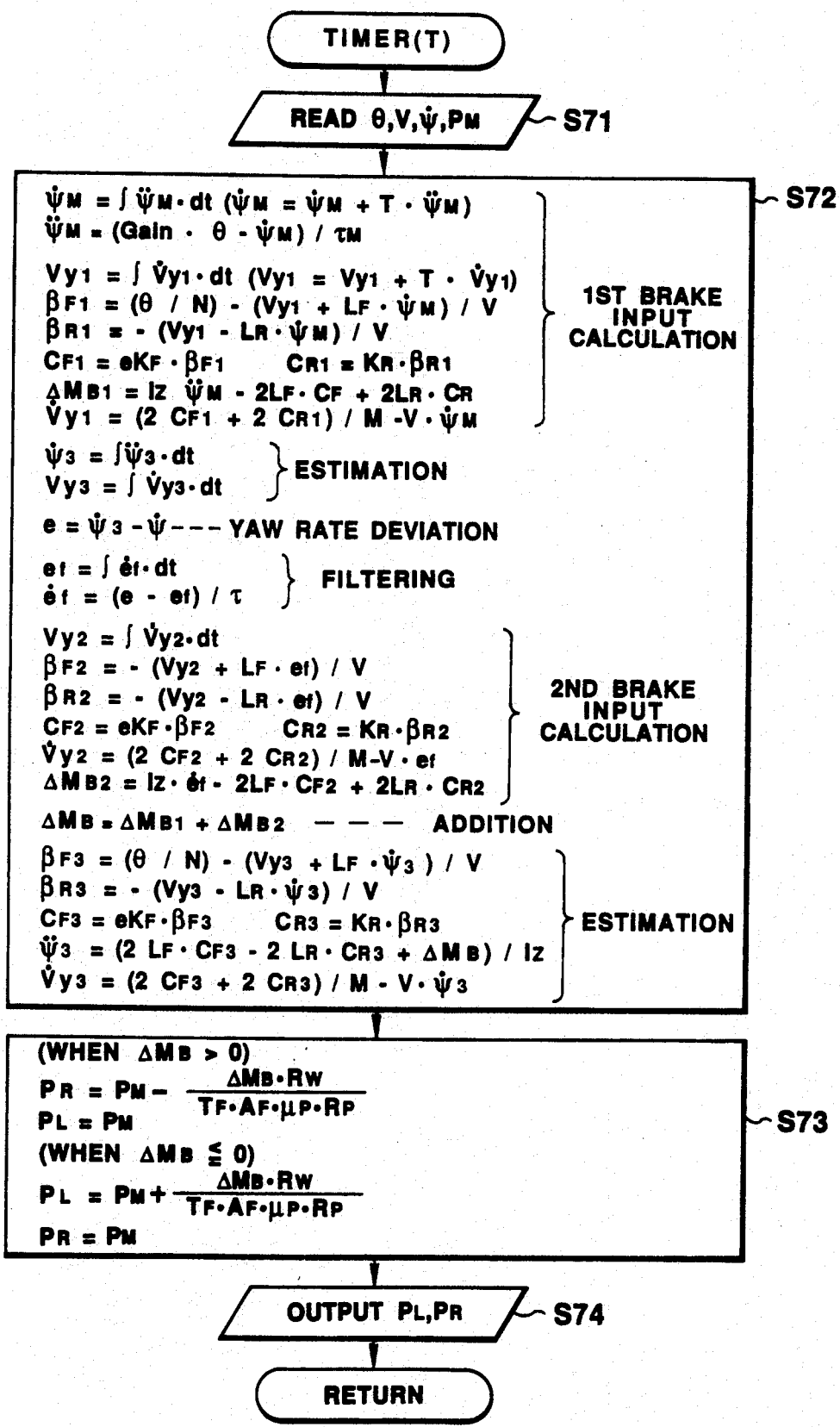
FIG. 7 is a flowchart showing a control program of the second embodiment.

A second embodiment of the present invention is shown in FIGS. 6 and 7. In the second embodiment, the controller 8 comprises a feedforward compensating section 24 and an adding section (or element) 25 as well as a vehicle motion estimating section 21, a subtracting section (or element) 22 and a feedback compensating section 23. The sections 21, 22 and 23 are substantially identical, respectively, to the sections 21, 22 and 23 of the first embodiment.

The feedforward compensating section 24 receives the steering angle signal $\theta$ as an input signal, and produces a first brake input control signal representing a first desired yawing moment $\Delta M_{B1}$. In the second embodiment, the output of the feedback compensating section 23 is treated as a second brake input control signal representing a second desired yawing moment $\Delta M_{B2}$. The adding section 25 receives both of the output signals of the feedback and feedforward compensating sections 23 and 24, and produces a final brake input control signal representing a final desired yawing moment $\Delta M_B$ which is a sum of $\Delta M_{B1}$ and $\Delta M_{B2}$.

The feedforward compensating section 24 determines the first yawing moment $\Delta M_{B1}$ by using the following relationship.

$$\Delta MB_1 = \frac{GM - GF_3}{GB_3} \theta$$

In this equation, $G_M$ is a desired reference model which is determined arbitrarily by a designer of the control system. The reference model $G_M$ of this embodiment is in te form of a desired transfer characteristic for determining a desired yaw rate corresponding to the steering angle $\theta$. For example, the reference model is a system of a first order lag having a time constant $\tau_M$. The first yawing moment $\Delta M_{B1}$ is a yaw rate required to reduce the difference between the desired yaw rate $G_M\theta$ of the reference model and the yaw rate $GF_3\theta$ determined by the transfer function $GF_3$ representing the controlled vehicle, or to achieve the desired yaw rate aimed at by the reference model.

The feedback compensating section 23 determines the second yawing moment $\Delta M_{B2}$ in the same manner as the feedback compensating section 23 of the first embodiment. The second yawing moment $\Delta M_{B2}$ of the feedback compensating section 23 is a yawing moment required to make the actual yaw rate $\dot\psi$ equal to the estimated yaw rate $\dot\psi_3$. The estimated yaw rate $\dot\psi_3$ is a theoretical yaw rate which the controlled vehicle should yield.

The adding section 25 adds the first and second yawing moments $\Delta M_{B1}$ and $\Delta M_{B2}$ together, and determines the final yawing moment $\Delta M_B$ which is the sum of the first and second yawing moments $\Delta M_{B1}$ and $\Delta M_{B2}$.

The vehicle control system of the second embodiment can also provide a stable braking performance like the control system of the first embodiment.

FIG. 7 shows the control program performed by the controller 8 of the second embodiment. Steps S71, S73 and S74 of FIG. 7 are substantially identical to the steps S31, S33 and S34 of FIG. 3. A step S72 of the second embodiment is obtained by replacing $\Delta M_B$ in the step S32 by $\Delta M_{B2}$, and adding mathematical operations of the feedforward compensating section 24 and the adding section 25 to the step S32 of FIG. 3.

The feedforward compensating section 24 of the controller 8 determines a desired yaw rate $\dot{\psi}_M$ to satisfy the reference model, by integration of a desired yaw acceleration $\ddot{\psi}_M$. In this example, the feedforward compensating section 24 uses an approximate integration expressed as $\dot{\psi}_M = \dot{\psi}_M + T \cdot \ddot{\psi}_M$, by using a previous value of the desired yaw acceleration $\ddot{\psi}$ which was determined in the most recent control cycle. Then, the feedforward compensating section 24 determines the desired yaw acceleration $\ddot{\psi}_M$ to be used in the next control cycle, by $\ddot{\psi}_M = (Gain \cdot \theta - \dot{\psi}_M)/\tau_M$.

Then, the feedforward section 24 calculates the first yawing moment $\Delta M_{B1}$ to make the theoretical yaw rate of the controlled vehicle equal to the desired yaw rate of the reference model, as follows:

First, the feedforward section 24 determines a desired side speed $V_{y1}$ to achieve the reference model, by integrating a desire side acceleration $\dot{V}_{y1}$ according to $V_{y1} = V_{y1} + T \cdot \dot{V}_{y1}$. From the thus-obtained side speed $V_{y1}$, the feedforward section 24 determines desired front and rear wheel side slip angles $\beta_{F1}$ and $\beta_{R1}$ required to achieve the reference model, by using the following equations.

$$\beta_{F1} = (\theta/N) - (V_{y1} + L_F \cdot \dot{\psi}_M)/V$$

$$\beta_{R1} = -(V_{y1} - L_R \cdot \dot{\psi}_M)/V$$

From these desired slip angles, the feedforward section 24 determines a desired front wheel cornering force $C_{F3}$ and a desired rear wheel cornering force $C_{R3}$ which are given by;

$$C_{F1} = eK_F \cdot \beta_{F1}$$

$$C_{R1} = K_R \cdot \beta_{R1}$$

From the desired cornering forces the feedback section 24 determines the first yawing moment $\Delta M_{B1}$ to achieve the reference model, by using;

$$\Delta M_{B1} = I_Z \ddot{\psi}_M - 2L_F \cdot C_F + 2L_R \cdot C_R$$

Finally, the feedforward section 24 determines the desired side acceleration $\dot{V}_{y1}$ for use in the next control cycle.

$$\dot{V}_{y1} = (2C_{F1} + 2C_{R1})/M - V \cdot \dot{\psi}_M$$

The adding section 25 of the controller 8 determines the final yawing moment $\Delta M_B$ by using $\Delta M_B = \Delta M_{B1} + \Delta M_{B2}$.

At the step S73, the controller 8 determines the left front and right front brake fluid pressures $P_L$ and $P_R$ required to produce the final yawing moment $\Delta M_B$, as in the step S33 of FIG. 3.

The control system according to the second embodiment can bring about advantageous effects in the same manner as the control system of the first embodiment.

Moreover, the control system according to the second embodiment can cause the actual vehicle behavior during braking to agree to the desired behavior of the reference model.

Figure 8A:
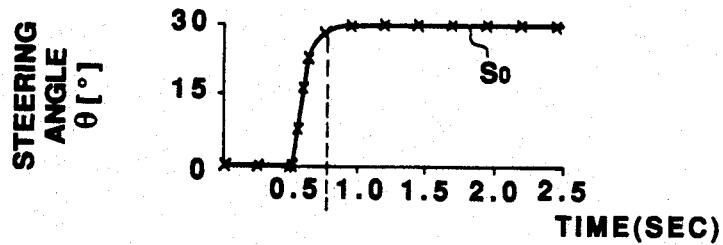
FIGS. 8A-E are graphical representations showing effects of the control system of the second embodiment.
Figure 8B:
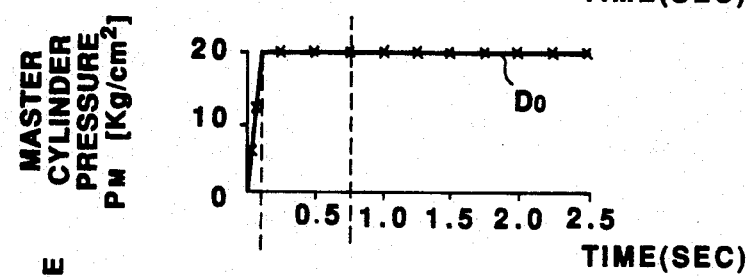
Figure 8C:
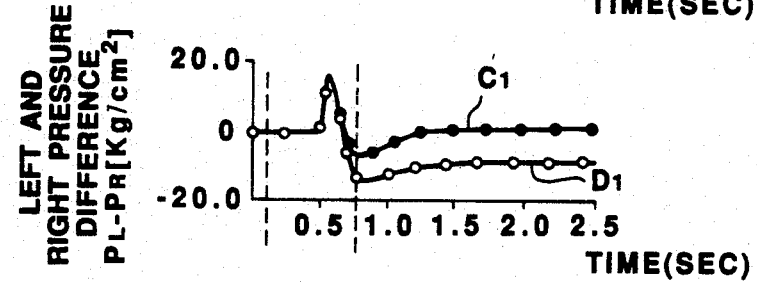
Figure 8D:
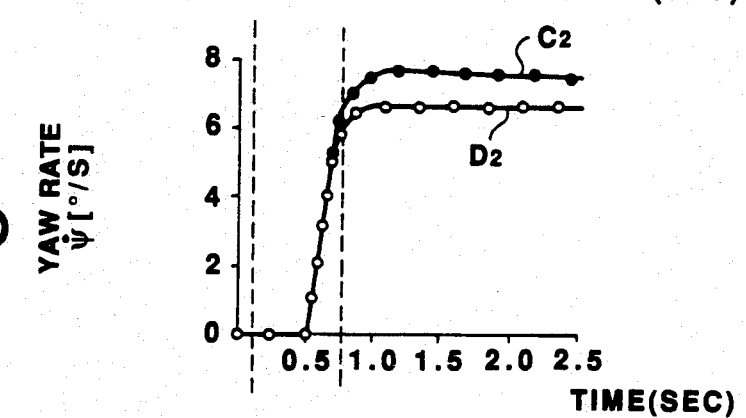
Figure 8E:
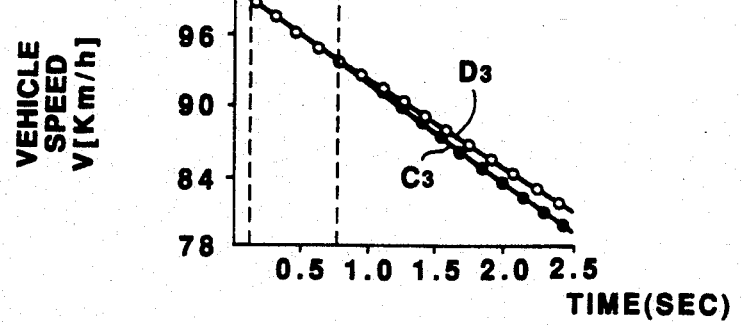

FIGS. 8A–E show the result of a simulation. When the steering angle $\theta$ is varied as shown by a line S0 in FIG. 8a during brake application in which the master cylinder fluid pressure $P_M$ is held high as shown by a line D0 in FIG. 8B, then the control system according to the second embodiment controls the yaw rate as shown by a line D2 in FIG. 8D by manipulating the left and right brake fluid pressure difference as shown by a line D1 (FIG. 8C). The vehicle speed is decreased as shown by a line D3 in FIG. 8E. Lines C1, C2 and C3 show characteristics of an example for comparison. A control system of this example employs only a reference model following control, and varies the left and right brake fluid pressure difference as shown by the line C1. In this example, the yaw rate response deviates from the reference model in an undesired direction toward the oversteering tendency as shown by the line C2 because of changes in the tire cornering powers (parameter changes) caused by weight transfer during braking. This deviation is detrimental to the safety of the vehicle. In contrast to this, the control system according to the second embodiment varies the left and right brake pressure difference $P_L - P_R$ as shown by the line D1 so as to compensate for changes in the tire cornering powers, and makes the actual yaw rate response agree to the desired yaw rate response of the reference model shown by the line D2.

The final yawing moment $\Delta M_B$ of the second embodiment is expressed as;

$$\Delta M_B = e\frac{F}{GB_3} + \theta \frac{GM - GF_3}{GB_3}$$

$$= (\Delta M_B GB_3 + \theta GF_3 - \psi)\frac{F}{GB_3} + \theta \frac{GM - GF_3}{GB_3}$$

$$= \Delta M_B F + \theta F \frac{GF_3}{GB_3} - \psi \frac{F}{GB_3} + \theta \frac{GM}{GB_3} - \theta \frac{GF_3}{GB_3}$$

$$\therefore \Delta M_B(1 - F) = \theta \frac{GM}{GB_3} - \theta(1 - F)\frac{GF_3}{GB_3} - \psi \frac{F}{GB_3}$$

$$\therefore \Delta M_B = \frac{1}{1 - F}\left\{\theta \frac{GM}{GB_3} - \theta(1 - F)\frac{GF_3}{GB_3} - \psi \frac{F}{GB_3}\right\}$$

Figure 9:
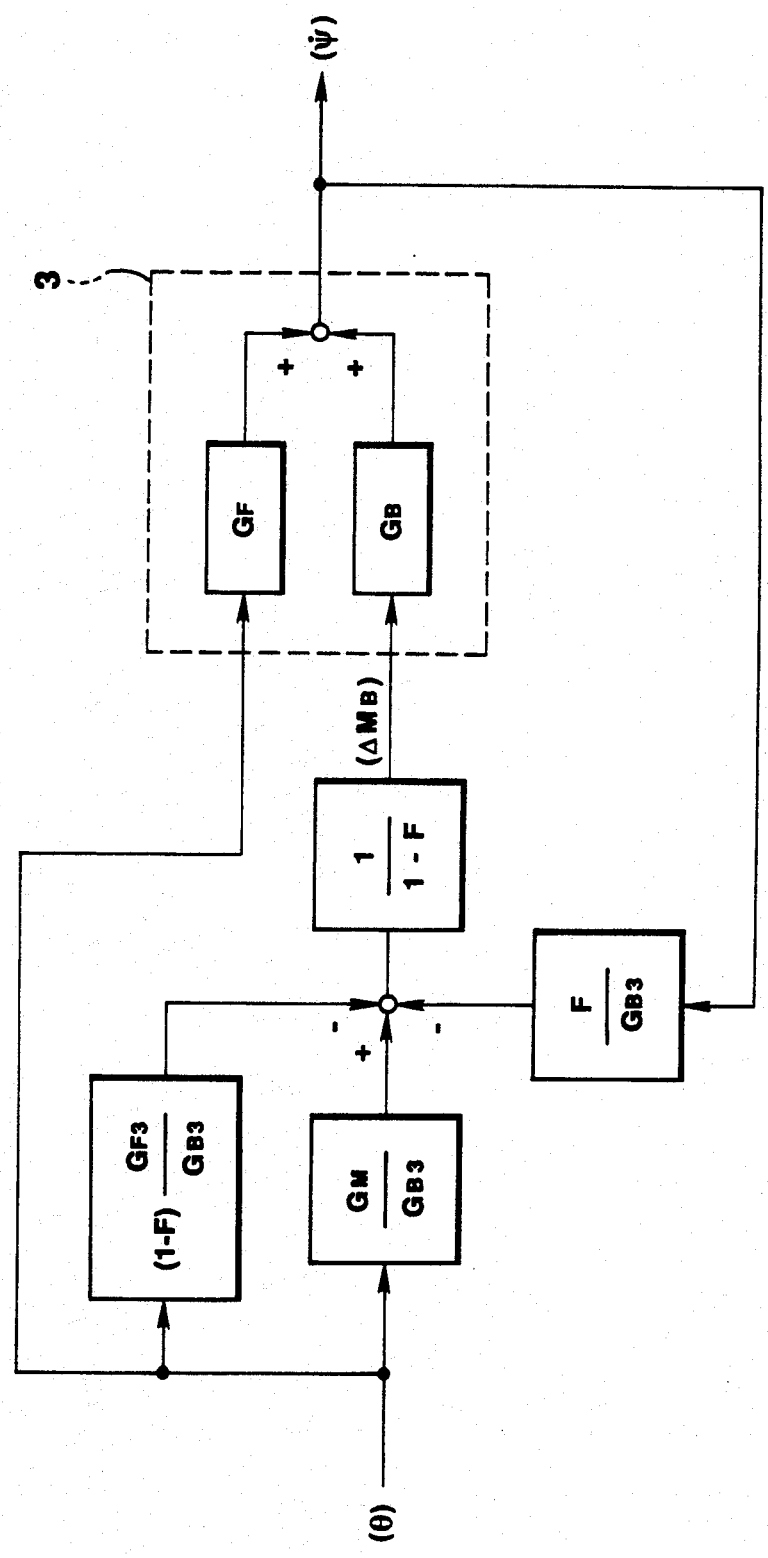
FIG. 9 is a block diagram showing the arrangement of transfer characteristics which is equivalent to the arrangement shown in FIG. 6.

Therefore, the transfer characteristic model shown in FIG. 9 is equivalent to that of FIG. 6.

Figure 10:
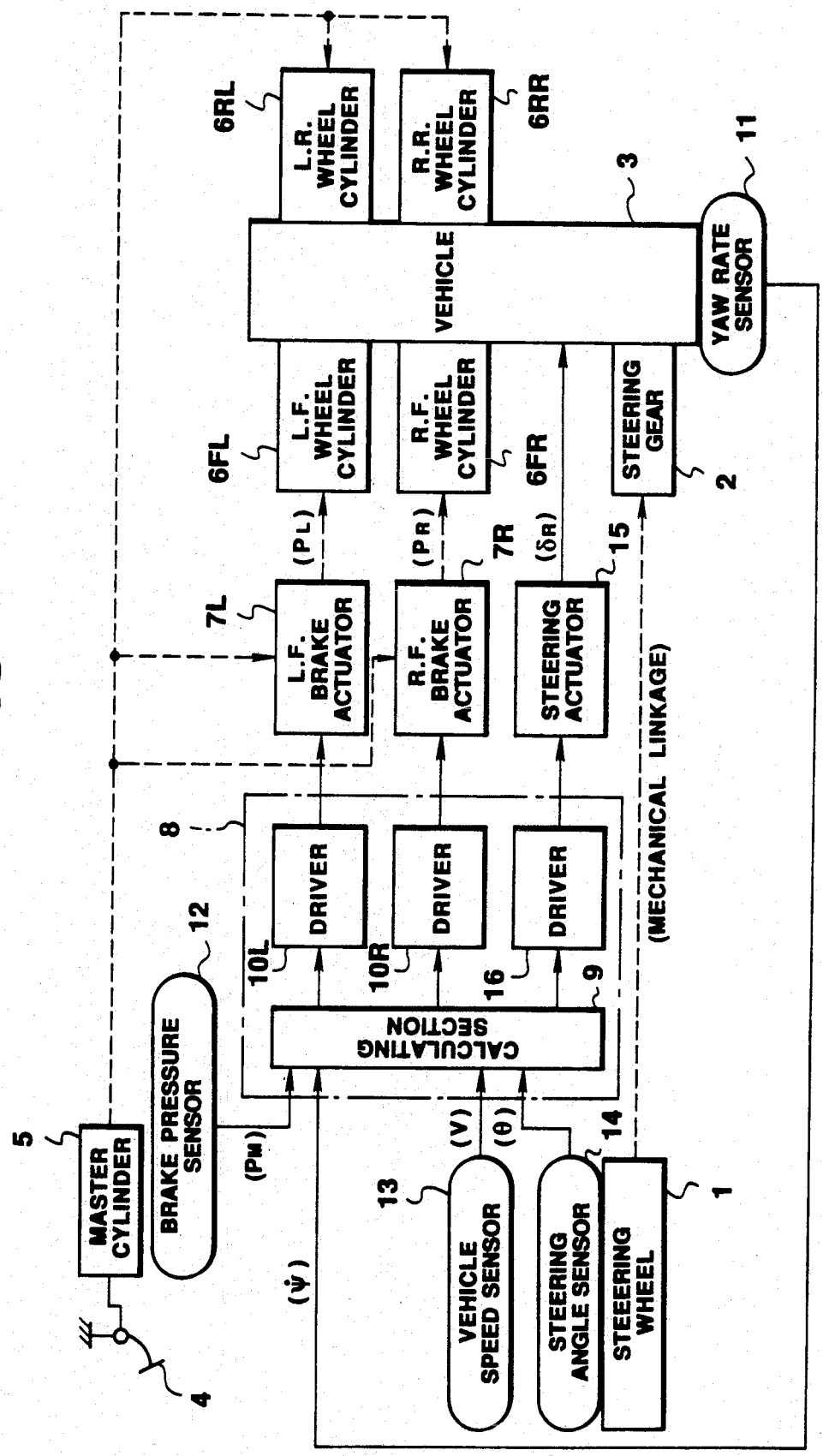
FIG. 10 is a block diagram showing a control system according to a third embodiment of the present invention.
Figure 11:
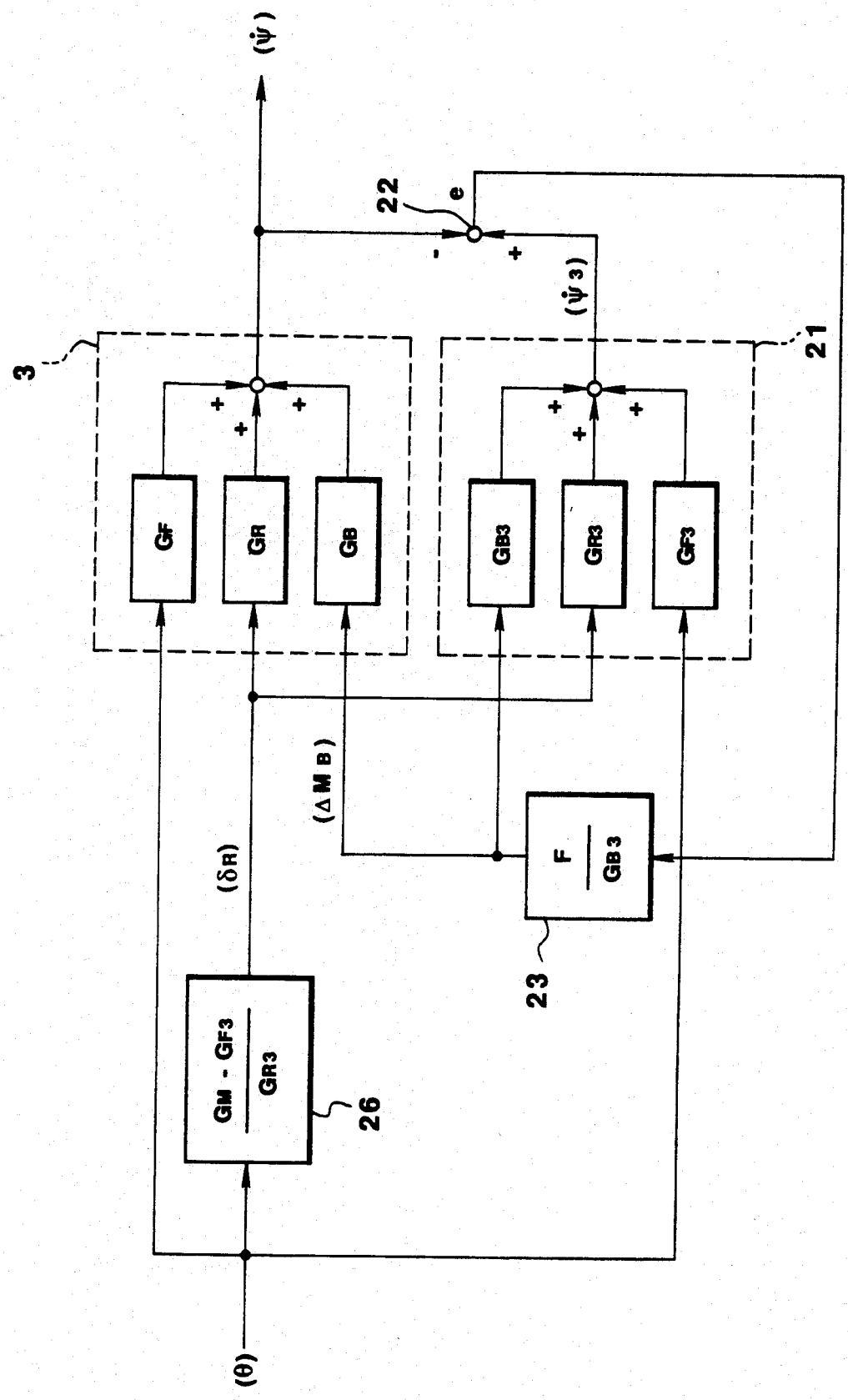
FIG. 11 is a block diagram showing the control system according to the third embodiment in terms of transfer characteristics.
Figure 12:
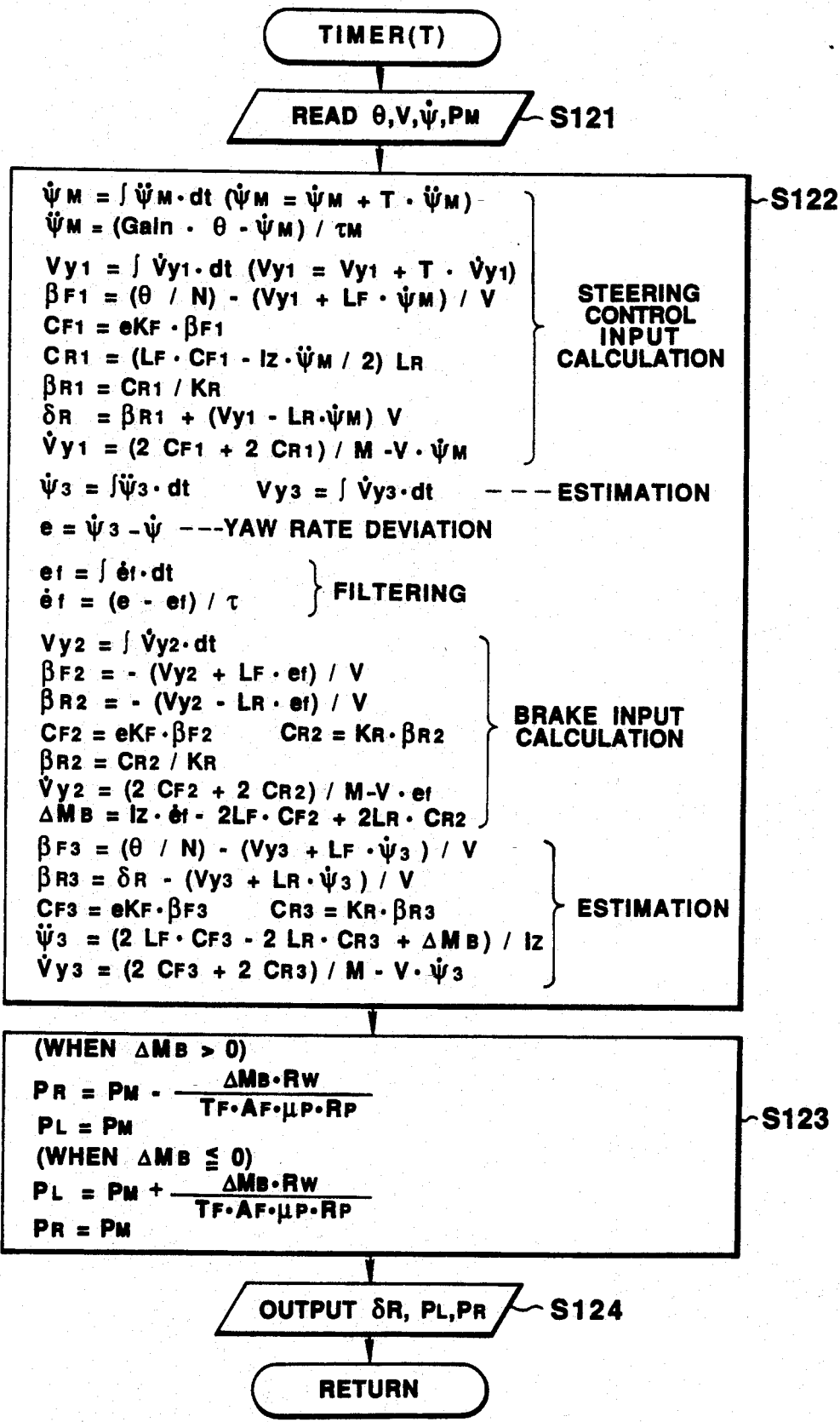
FIG. 12 is a flowchart showing a control program of the third embodiment.
Figure 13A:
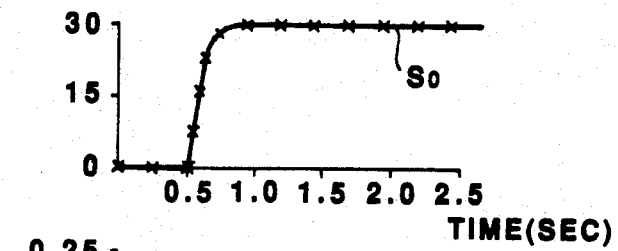
FIGS. 13A-F are graphical representations showing effects of the control system of the third embodiment.
Figure 13B:
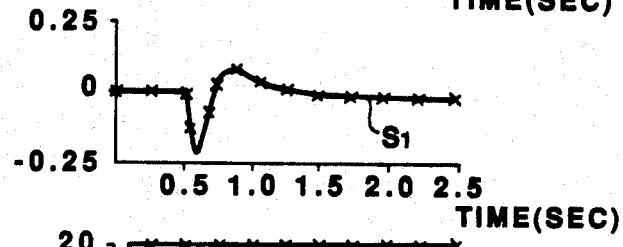
Figure 13C:
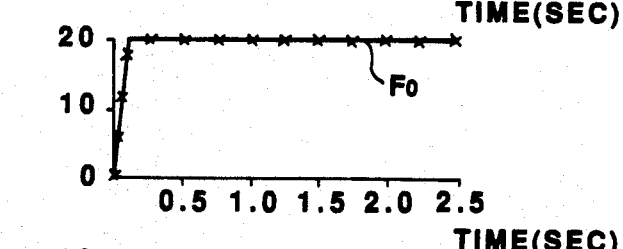
Figure 13D:
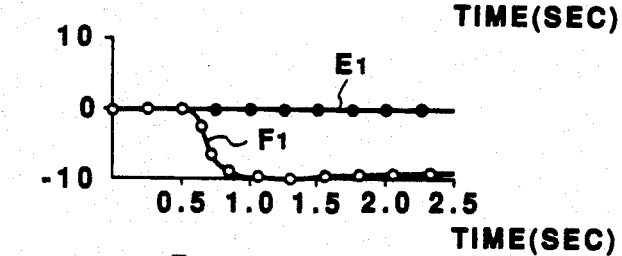
Figure 13E:
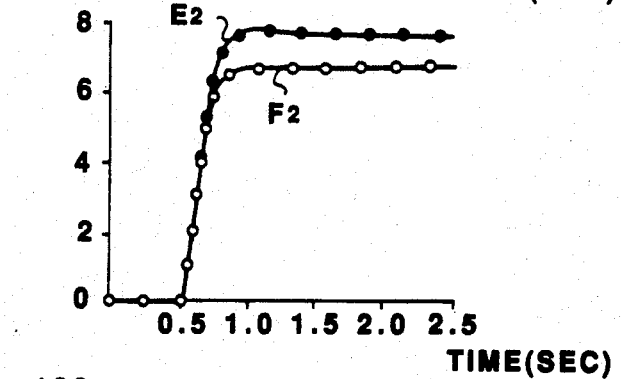
Figure 13F:
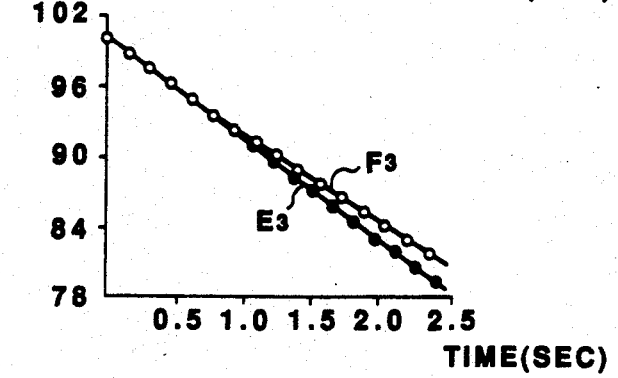

A third embodiment of the present invention is shown in FIGS. 10, 11 and 12. A vehicle control system according to the third embodiment comprises not only the brake actuators 7L and 7R, but also a steering actuator 15. A controller 8 of the third embodiment comprises a third driver circuit 16 for sending a steer angle control signal to the steering actuator 15. A calculating section 9 of the controller 8 is designed to determine not only the brake control input but also a steering control input. In this embodiment, the steering actuator 15 is arranged to steer the rear wheels of the controlled vehicle 3. The conventional front steering linkage mechanically connects the steering wheel to the front wheels, and serves as a primary steering means. The steering actuator 15 serves as an auxiliary steering means. In the third embodiment, the steering control input is in the form of a rear wheel steer angle $\delta_R$. The controller 8 calculates a desired rear wheel steer angle $\delta_R$. The brake system of the third embodiment is the same as that of the first embodiment. The sensor group is also the same as that of the first embodiment.

As shown in FIG. 11, the controller 8 of the third embodiment comprises a vehicle motion estimation section 21, a subtracting section (or element) 22, a feedback brake compensating section 23, and a feedforward steering controlling section 26. The steering controlling section 26 receives the steering angle signal representing the steering wheel angle $\theta$ from the steering angle sensor 14, and produce a rear wheel steer angle control signal representing a desired rear wheel steer angle $\delta_R$. Therefore, the control system of the third embodiment can provide a desired yawing response. The controlled vehicle 3 of the third embodiment receives the primary steering input placed on the front wheel steering system, the auxiliary steering input in the form of the rear wheel steer angle and the brake input $\Delta M_B$, and yields the actual yaw rate $\dot{\psi}$ which is the sum of a first yaw rate output which is a response to the primary steering input, determined by an actual vehicle transfer function $G_F$, a second yaw rate output which is a response to the auxiliary steering input, determined by an actual vehicle transfer function $G_R$ between the rear wheel steer angle and vehicle yaw rate, and a third yaw rate output which is a response to the brake input $\Delta M_B$, determined by an actual vehicle transfer function $G_B$.

Accordingly, the motion estimating section 21 of the third embodiment determines an estimated yaw rate $\dot{\psi}_3$ which is the sum of a first estimator output determined from the steering wheel angle $\theta$ by a first theoretical estimator transfer function $G_{F3}$, a second estimator output determined from the rear wheel steer angle $\delta_R$ by a second theoretical estimator transfer function $G_{R3}$, and a third estimator output determined from the brake input $\Delta M_B$ by a third theoretical estimator transfer function $G_{B3}$. In this way, the motion estimating section 21 simulates the controlled vehicle 3, and theoretically determines the yaw rate $\dot{\psi}$ of the controlled vehicle 3.

The feedforward controlling section 26 of the third embodiment determines the desired rear wheel steer angle $\delta_R$ according to a model matching control method similar to the control method disclosed in a section "3.1 Model Matching Control of Yaw Rate" of "A New Way of Controlling a Four Wheel Steering Vehicle" by Ken Ito et al. which appeared in *Keisokujidoseigyogakkai Ronbunshu*, Vol. 23, No. 8. The explanation of this document is herein incorporated by reference.

The feedforward controlling section 26 determines the desired rear wheel steer angle $\delta_R$ by using the following relationship.

$$\delta_R = \frac{G_M - G_{F3}}{G_{R3}} \theta$$

In this equation, $G_M$ is a reference model which is determined arbitrarily by a designer of the control system. The reference model $G_M$ is a desired transfer characteristic for determining a desired yaw rate corresponding to the steering angle $\theta$. For example, the reference model is chosen so that the yaw rate is produced in the manner of a first order lag element having $\tau_M$. The control system places the auxiliary steering input upon a movable element of the rear wheel steering mechanism of the vehicle. The desired rear wheel steer angle $\delta_R$ is determined from $\theta$ so as to reduce the difference between the desired yaw rate $G_M\theta$ according to the reference model, and the yaw rate $G_{F3}\theta$ according to the theoretical transfer function $G_{F3}$ of the controlled vehicle 3, or to achieve the desired yaw rate according to the reference model.

Therefore, the vehicle control system can provide the yaw rate response in agreement with the desired reference model $G_M$ by steering the rear wheels, and prevent undesired influences of disturbances during braking on the yawing response by varying the brake control input $\Delta M_B$.

FIG. 12 shows the control program performed by the controller 8 of the third embodiment. Steps S121 and S123 are substantially identical to the steps S31 and S33 of FIG. 3, respectively. A step S122 of FIG. 12 is obtained by adding mathematical operations of the feedforward steering controlling section 26 to determine the desired rear wheel steer angle $\delta_R$ to the step S32 of FIG. 3, and adding the term of the desired rear wheel steer angle $\delta_R$ to the equation defining $\beta_{R3}$ in the step S32. In the final step S124, the controller 8 of the third embodiment outputs the rear wheel steer angle control signal representing $\delta_R$ as well as the left brake force control signal representing $P_L$ and the right brake force control signal representing $P_R$.

The feedforward steering controlling section 26 determines a desired yaw rate $\dot{\psi}_M$ ($= \int \ddot{\psi}_M \cdot dt$) by using $\omega_M = \dot{\psi}_M + T \cdot \ddot{\psi}_M$. The feedforward section 26 further determines the desired yaw acceleration $\ddot{\psi}_M$ to be used in the next control cycle, by using $\ddot{\psi}_M = (Gain \cdot \theta - \dot{\psi}_M)/\tau_M$.

Then, the feedforward steering controlling section 26 determines the desired auxiliary rear wheel steer angle $\delta_R$ to make the theoretical yaw rate of the controlled vehicle 3 equal to the desired yaw rate of the reference model.

First, the feedforward section 26 determines a desired side speed $V_{y1}$ to achieve the reference model, by integrating a desire side acceleration $\dot{V}_{y1}$ according to $V_{y1} = V_{y1} + T \cdot \dot{V}_{y1}$. From the thus-obtained side speed $V_{y1}$, the feeforward section 26 determines a desired front wheel side slip angle $\beta_{F1}$ required to achieve the reference model, by using the following equation.

$$\beta_{F1} = (\theta/N) - (V_{y1} + L_F \cdot \dot{\psi}_M)/V$$

From this desired slip angle, the feedforward section 26 determines a desired front wheel cornering force $C_{F1}$ corresponding to $\beta_{F1}$, and a desired rear wheel cornering force $C_{R1}$ which are given by;

$$C_{F1} = eK_F \cdot \beta_{F1}$$

$$C_{R1} = (L_F \cdot C_{F1} - I_z \cdot \ddot{\psi}_M/2)/L_R$$

Then, the feedforward section 26 determines the desired auxiliary rear wheel steer angle $\delta_R$ to achieve the reference model, by using;

$$\delta_R = \beta_{R1} + (V_{y1} + L_R \cdot \dot{\psi}_M)/V$$

Finally, the feedforward section 26 determines the desired side acceleration $\dot{V}_{y1}$ for use in the next control cycle.

$$\dot{V}_{y1} = (2C_{F1} + 2C_{R1})/M - V \cdot \dot{\psi}_M$$

The thus-obtained auxiliary rear wheel steer angle δR is used for the motion estimating section 21 to determine the rear wheel side slip angle βR3 as follows;

$$\beta_{R3} = \delta_R - (V_{y3} - L_R \cdot \dot{\psi}_3)/V$$

Furthermore, the thus-obtained auxiliary rear wheel steer angle δR is outputted at the step S124.

The rear wheel steer angle control signal representing δR is delivered to the rear wheel steering actuator 15 through the third driver circuit 16. In response to this steer angle control signal, the steering actuator 15 makes the actual rear wheel steer angle equal to the desired steer angle δR to provide a vehicle steering response consistent with the desired reference model. Furthermore, the control system of the third embodiment can also avert undesired influences of parameter variations during braking on the directional vehicle response as in the preceding embodiments.

FIGS. 13A-F show the results of a simulation. When the steering angle θ is varied as shown by a line S0 in FIG. 13a during brake application in which the master cylinder fluid pressure PM is held high as shown by a line F0 in FIG. 13. then the control system according to the third embodiment controls the yaw rate as shown by a line F2 in FIG. 13D by manipulating the left and right brake fluid pressure difference as shown by a line F1 in FIG. 13c. The vehicle speed is decreased as shown by a line F3. Lines E1, E2 and E3 show characteristics of an example for comparison. A control system of this example employs only a feedforward auxiliary rear wheel steer angle control disclosed in the above-mentioned document. In the control system of this example, the left and right brake fluid pressure difference PL−PR is fixed at zero as shown by the line E1, and only the rear wheel steer angle is controlled as shown by a line S1. In this example, the yaw rate response deviates from the reference model in an undesired direction toward the oversteering as shown by the line E2, because of changes in the tire cornering powers (parameter changes) caused by weight transfer during braking. This deviation is detrimental to the safety of the vehicle. In contrast to this, the control system according to the third embodiment controls the left and right brake pressure difference PL−PR as shown by the line F1 so as to compensate for changes in the tire cornering powers, and makes the actual yaw rate response agree to the desired yaw rate response of the reference model shown by the line F2. The rate of decrease of the vehicle speed shown by line F3 is slightly worse than the characteristic E3 of the comparative example. However, the extent of this deterioration is trivial.

The control system of the third embodiment employs the auxiliary rear wheel steer angle control system in addition to the brake control system. However, it is optional to employ an auxiliary front wheel steer angle control system in which an actual front wheel steer angle is controlled to be equal to the sum of a primary front wheel steer angle determined by the mechanical front steering linkage, and an auxiliary front wheel steer angle electronically determined by an electronic controller, or a steer-by-wire type steering system in which the actual front wheel steer angle is determined only by an electronic controller. Furthermore, it is optional to employ a well-known model following control of the lateral acceleration in the feedforward steering controlling section 26.

In the case of a four wheel vehicle, it is possible to employ any brake actuating system (or modulating system) as long as it can develop a braking force difference between any one or more of all the possible left and right wheel pairs which are the front pair of the left and right front wheels, the rear pair of the left and right rear wheels, the diagonal pair of the left front wheel and the right rear wheel, and the diagonal pair of the right front wheel and the left rear wheel.

It is possible to produce the left and right brake fluid pressure difference in various manners. For example, one of the left and right fluid pressure PL and PR is made equal to the master cylinder pressure PM, and the other is made lower than PM. This method slightly degrades the brake effectiveness. On the other hand, the brake effectiveness is improved when the lower of PL and PR is made equal to the master cylinder pressure PM and the higher is made higher than PM. Various hydraulic means for increasing a brake fluid pressure beyond the master cylinder output pressure are known. For example, it is possible to increase the brake fluid pressure by using an additional fluid pressure source.

In FIGS. 2, 6 and 11, the brake force determining section for determining the left and right brake actuation forces is not shown. The block of GB of the vehicle 3 can be regarded as a system which includes the brake force determining section and the brake actuating means. Alternatively, the transfer function system shown in FIGS. 2, 6 or 11 can be rearraged so that a block representing the brake force determining section is connected between the block of the feedback compensating section 23, and the block of GB of the vehicle 3. The feedback compensating section 23 according to the present invention may comprises a filtering section (or means) and a brake input determining section (or means) which are both single-input-single-output elements, and which are connected in series. The filtering section receives the yaw rate deviation and determines a filtered deviation, and the brake input determining section receives the filtered deviation and determines the desired yawing moment.

What is claimed is:

1. A control system for a wheeled vehicle, comprising:

a brake system for braking said vehicle;

a steering system for steering said vehicle;

a brake actuating means for controlling a behavior of the vehicle during braking by developing a left and right braking force difference between left and right wheels of the vehicle in accordance with a braking force difference control signal representing a brake control input;

a sensing means for sensing an actual steering input applied to said steering system by a driver of the vehicle, and an actual vehicle motion variable of the vehicle; and a controlling means for determining an estimated vehicle motion variable from said actual steering input and said brake control input by using a first predetermined estimator transfer function for determining a theoretical vehicle steering response from said actual steering input to said steering system and a second predetermined estimator transfer function for determining a theoretical vehicle response due to braking from said brake control input to said brake system, further determining a deviation of said actual vehicle motion variable from said estimated vehicle motion variable, and further determining said brake control input of said brake control signal in accordance with said deviation by using a predetermined compensator transfer function for determining a desired brake input to said brake system from a desired vehicle response and a predetermined filter transfer function.

2. A control system according to claim 1 wherein said brake actuating means comprises a left brake actuator for varying an actual left brake actuation force applied to said left wheel of the vehicle in response to a left brake force control signal representing a desired left brake actuation force, and a right brake actuator for varying an actual right brake actuation force applied to said right wheel in response to a right brake force control signal representing a desired right brake actuation force, and said controlling means includes a means for determining said desired left and right brake actuation forces which are different from each other by an amount proportional to said brake control input, and producing said left and right brake force control signals.

3. A control system according to claim 2 wherein said brake system is a hydraulic brake system and comprises a left wheel cylinder for braking said left wheel by receiving a left brake fluid pressure and a right wheel cylinder for braking said right wheel by receiving a right brake fluid pressure, each of said left and right brake actuators is an electrohydraulic means for varying a fluid pressure in response to an electric signal, and said controlling means includes a means for determining said brake control input which is in a form of a vehicle yawing moment due to a difference between a left braking force acting at a left side of the vehicle and a right braking force acting at a right side of the vehicle.

4. A control system according to claim 2 wherein said sensing means comprises a means for determining an actual yaw rate of the vehicle as said actual vehicle motion variable, and said controlling means includes a means for determining an estimated yaw rate as said estimated vehicle turning motion variable.

5. A control system according to claim 2 wherein said controlling means comprises a first operational means for receiving a vehicle motion variable signal representing said actual vehicle motion variable from said sensing means and producing a first intermediate signal from said vehicle motion variable signal according to a first transfer function ($F/G_{B3}$) whose numerator is said filter transfer function ($F$) and whose denominator is said second estimator transfer function ($G_{B3}$), a second operational means for receiving a steering angle signal representing said actual steering input from said sensing means and producing a second intermediate signal from said steering angle signal according to a second transfer function $F(G_{F3}/G_{B3})$ whose numerator is a product between said filter transfer function and said first estimator transfer function ($G_{F3}$) and whose denominator is said second estimator transfer function, a subtracting means for receiving said first and second intermediate signals and producing a third intermediate signal which is equal to a difference between said first and second intermediate signals, and a third operational means for receiving said third intermediate signal and producing said braking force difference control signal from said third intermediate signal according to a third transfer function ($1/(1-F)$) whose numerator is equal to one and whose denominator is equal to a difference between one and said filter transfer function.

6. A control system according to claim 2 wherein said sensing means comprises a steering angle sensor for sensing a steering wheel angle of the vehicle as said steering input and producing a steering angle signal representing said steering wheel angle and a vehicle motion sensing means for determining said actual vehicle motion variable representing a vehicle planar motion which is one of a vehicle yawing motion and a vehicle side translational motion and producing a vehicle motion variable signal representing said actual vehicle motion variable, said controlling means comprises a vehicle motion estimating means for receiving said steering angle signal and said braking force difference control signal, determining a first estimated vehicle output resulting from said steering input by using said first estimator transfer function for determining a vehicle steering response of one of the vehicle yawing motion and the vehicle side translational motion from a steering input, further determining a second estimated vehicle output resulting from said brake control input by using said second estimator transfer function for determining a vehicle response of one of the vehicle yawing motion and the vehicle side translational motion from an input to said brake system and further determining said estimated vehicle motion variable which is a sum of said first and second estimated vehicle outputs.

7. A control system according to claim 6 wherein said controlling means further comprises a subtracting means for comparing said actual vehicle motion variable with said estimated vehicle motion variable to determine said deviation, a feedback compensating means for producing said braking force difference control signal in accordance with said deviation so as to reduce said deviation by using said compensator transfer function which is in a form of a function of said second estimator transfer function and which is designed to determine a desired vehicle yawing moment from said deviation, and an brake actuation force determining means for determining said desired left and right brake actuation forces in accordance with said desired vehicle yawing moment.

8. A control system according to claim 7 wherein said feedback compensating means of said controlling means comprises a filtering means for receiving a deviation signal representing said deviation from said subtracting means and producing a filter output signal from said deviation signal according to said filter transfer function, and a brake input determining means for receiving said filter output signal from said filtering means and producing said braking force difference control signal from said filter output signal according to said compensator transfer function.

9. A control system according to claim 8 wherein said sensing means further comprises a brake pressure sensing means for sensing a master cylinder fluid pressure which is an output fluid pressure of a master cylinder of said brake system, and said brake actuation force determining means includes a means for determining desired left and right brake fluid pressures one of which is equal to said master cylinder pressure and the other of which is different from said master cylinder pressure by an amount proportional to said desired vehicle yawing moment.

10. A control system according to claim 1 wherein said control system further comprises a steering actuating means for varying a wheel steer angle of said vehicle in response to a steering control signal representing a desired steer angle, and said controlling means comprises a steer angle determining means for receiving a signal representing said steering input from said sensing means and producing said steering control signal, and a vehicle motion estimating means for determining said estimated vehicle motion variable from said steering input, said brake control input and said desired steer angle by using not only said first and second estimator transfer function, but also a predetermined third transfer function for determining a vehicle response from an input to the steering system.

11. A control system according to claim 10 wherein said sensing means comprises a vehicle speed sensing means for sensing a vehicle speed of said vehicle, and said vehicle motion estimating means includes a means for determining said estimated vehicle motion variable by using said first, second and third estimator transfer functions each of which comprises at least one parameter which is determined in accordance with said vehicle speed.

12. A control system according to claim 10 wherein said steer angle determining means includes a means for determining said desired steer angle from said steering input sensed by said sensing means, by using a desired reference transfer function which is a transfer function for determining a vehicle response from a steering input.

13. A control system according to claim 12 wherein said steering system comprises a steering wheel and a mechanical front steering linkage for mechanically steering front wheels of said vehicle in accordance with an angular displacement of said steering wheel, said sensing means comprises a steering angle sensing means for sensing a steering wheel angle of said steering wheel as said steering input, said steering actuating comprises a steering actuator for varying a rear wheel steer angle of the vehicle in response to said steering control signal said desired steer angle for rear wheels of said vehicle, and said steer angle determining means includes a means for determining said desired steer angle for said rear wheels by using said reference transfer function designed to determine a desired vehicle steering response from said steering wheel angle, and said first and third estimator transfer functions.

14. A control system for a wheeled vehicle, comprising:
a brake system for braking said vehicle;
a steering system for steering said vehicle;
a brake actuating means for controlling a behavior of the vehicle during braking by developing a left and right braking force difference between left and right wheels of the vehicle in accordance with a braking force difference control signal representing a brake control input;
a sensing means for sensing an actual steering input applied to said steering system by a driver of the vehicle, and an actual vehicle motion variable of the vehicle, said sensing means comprising a steering angle sensing means for determining said actual steering input by sensing a displacement of a movable element of said steering system and a vehicle motion sensing means for determining said actual vehicle motion variable representing a vehicle planar motion including a vehicle yawing motion and a vehicle side translational motion; and
a controlling means for determining an estimated vehicle motion variable from said actual steering input and said brake control input by using a first predetermined estimator transfer function for determining a theoretical vehicle steering response from said actual steering input and a second predetermined estimator transfer function for determining a theoretical vehicle response due to braking from said brake control input, further determining a deviation of said actual vehicle motion variable from said estimated vehicle motion variable, and further determining said brake control input of said brake control signal in accordance with said deviation by using a predetermined compensator transfer function, and a predetermined filter transfer function, said controlling means including a means for determining said brake control input, by using said compensator transfer function which is in an inverse form of said second estimator transfer characteristic and said filter transfer function, and causing said brake actuating means to increase said left and right brake force difference by increasing said brake control input.

15. A control system according to claim 14 wherein said controlling means comprises a feedforward compensating means for determining a first braking force difference input in accordance with said steering input, a feedback compensating means for determining a second braking force difference input in accordance with said deviation by using said compensator transfer functions and said filter transfer functions and an adding means for determining said brake control input which is a sum of said first and second braking force difference inputs.

16. A control system according to claim 15 wherein said feedforward compensating means of said controlling means includes a means for determining said first braking force difference input by using a predetermined reference transfer function for determining a desired vehicle motion variable from a steering input, a predetermined steering response transfer function for determining a vehicle response to a steering input, and a predetermined brake response transfer function for determining a vehicle response from an input to the brake system.

17. A control system according to claim 16 wherein said feedforward compensating means includes a means for determining said first braking force difference input from said steering input according to a predetermined total transfer function whose numerator is a difference between said reference transfer function and said steering response transfer function, and whose denominator is said brake response transfer function.

18. A control system according to claim 17 wherein said feedforward compensating means includes a means for storing said steering response transfer function which is identical to said first estimator trnasfer function, and said second estimator transfer function.

19. A steering control system according to claim 14 wherein said sensing means further comprises a vehicle speed sensing means for sensing a vehicle speed of said vehicle, and said controlling means comprises a vehicle motion estimating means for determining said estimated vehicle motion variable by using said first and second estimator transfer characteristics each of which has at least one parameter which is dependent on said vehicle speed.

20. A control system according to claim 14 wherein said controlling means comprises a feedback compensating means for determining said brake control input by using said compensator transfer function, and said filter transfer function having a characteristic such that a steady state gain is equal to one, and a difference resulting from subtraction of an order of a numerator of said filter transfer function from an order of a denominator of said filter transfer function is equal to or higher than a difference resulting from subtraction of an order of a numerator of said second estimator transfer function from an order of a denominator of said second estimator transfer function.

21. A control system according to claim 20 wherein said controlling means further comprises a vehicle motion estimating means for determining said estimated motion variable by using said second estimator transfer function which is expressed by a fraction whose numerator is a first order differential equation and whose denominator is a second order differential equation, and said feedback compensating means includes a means for determining said brake control input by using said filter transfer function which is expressed by a fraction whose numerator is a zero order differential equation and whose denominator is a first order differential equation.

* * * * *